(12) United States Patent
Ichikawa

(10) Patent No.: US 10,562,395 B2
(45) Date of Patent: Feb. 18, 2020

(54) CONTROL DEVICE FOR HYBRID VEHICLE AND CONTROL METHOD FOR HYBRID VEHICLE

(71) Applicant: TOYOTA JIDOSHA KABUSHIKI KAISHA, Toyota-shi, Aichi-ken (JP)

(72) Inventor: Shinji Ichikawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 176 days.

(21) Appl. No.: 15/834,973

(22) Filed: Dec. 7, 2017

(65) Prior Publication Data

US 2018/0170194 A1 Jun. 21, 2018

(30) Foreign Application Priority Data

Dec. 19, 2016 (JP) .............................. 2016-245354

(51) Int. Cl.
*B60W 20/12* (2016.01)
*B60L 11/18* (2006.01)
(Continued)

(52) U.S. Cl.
CPC .......... *B60L 11/1816* (2013.01); *B60K 6/445* (2013.01); *B60L 50/16* (2019.02);
(Continued)

(58) Field of Classification Search
CPC ...... B60L 11/1816; B60L 50/16; B60L 53/14; B60L 58/13; B60L 2210/40;
(Continued)

(56) References Cited

U.S. PATENT DOCUMENTS 7,849,944 B2 * 12/2010 DeVault ................. B60K 6/365
180/65.29
9,180,783 B1 11/2015 Penilla et al.
(Continued)

FOREIGN PATENT DOCUMENTS

EP 2 782 063 A1 9/2014
JP 2008-100646 A 5/2008
(Continued)

OTHER PUBLICATIONS

May 7, 2018 Extended European Search Report issued in European Patent Application No. 17207502.0.

*Primary Examiner* — Calvin Cheung
(74) *Attorney, Agent, or Firm* — Oliff PLC

(57) ABSTRACT

A control device for a hybrid vehicle is provided with an internal combustion engine and an electric motor. The control device includes an acquisition unit, a determination unit, and a controller. The acquisition unit acquires a plurality of pieces of vehicle information regarding the vehicle configured to be externally charged. The vehicle information includes information related to a destination of the vehicle. The determination unit determines whether or not the hybrid vehicle is externally charged at the destination based on at least one piece of vehicle information regarding a same-destination vehicle including at least one of a vehicle having the same destination as the hybrid vehicle and a vehicle that has arrived at the destination of the hybrid vehicle. The controller controls the hybrid vehicle in accordance with a result of the determination by the determination unit.

15 Claims, 13 Drawing Sheets

(51) Int. Cl.

| | | |
|---|---|---|
| *B60W 10/08* | (2006.01) | |
| *B60W 10/06* | (2006.01) | |
| *B60L 53/14* | (2019.01) | |
| *B60L 50/16* | (2019.01) | |
| *B60L 58/13* | (2019.01) | |
| *B60W 20/13* | (2016.01) | |
| *B60K 6/445* | (2007.10) | |
| *B60W 10/26* | (2006.01) | |
| *G01C 21/36* | (2006.01) | |
| *G08G 1/0969* | (2006.01) | |

(52) U.S. Cl.
CPC ............... *B60L 53/14* (2019.02); *B60L 58/13* (2019.02); *B60W 10/06* (2013.01); *B60W 10/08* (2013.01); *B60W 10/26* (2013.01); *B60W 20/12* (2016.01); *B60W 20/13* (2016.01); *G01C 21/3605* (2013.01); *G08G 1/0969* (2013.01); *B60L 2210/40* (2013.01); *B60L 2240/60* (2013.01); *B60L 2240/622* (2013.01); *B60L 2240/70* (2013.01); *B60L 2250/16* (2013.01); *B60L 2260/52* (2013.01); *B60W 2710/244* (2013.01); *B60Y 2400/214* (2013.01); *B60Y 2400/92* (2013.01); *Y02T 10/7005* (2013.01); *Y02T 10/705* (2013.01); *Y02T 10/7044* (2013.01); *Y02T 10/7291* (2013.01); *Y02T 90/16* (2013.01); *Y02T 90/161* (2013.01); *Y02T 90/168* (2013.01); *Y04S 30/12* (2013.01)

(58) Field of Classification Search
CPC ........... B60L 2240/60; B60L 2240/622; B60L 2240/70; B60L 2250/16; B60L 2260/52; B60W 20/12; B60W 20/13; B60W 10/06; B60W 10/08; B60W 10/26; B60W 2710/244; B60K 6/445
See application file for complete search history.

(56) References Cited

U.S. PATENT DOCUMENTS

| | | | |
|---|---|---|---|
| 2010/0217485 A1 | 8/2010 | Ichishi | |
| 2012/0233077 A1 | 9/2012 | Tate, Jr. et al. | |
| 2014/0067660 A1* | 3/2014 | Cornish | ............... G06Q 20/145 705/39 |
| 2015/0298565 A1* | 10/2015 | Iwamura | ............ G01C 21/3476 701/22 |

FOREIGN PATENT DOCUMENTS

| | | |
|---|---|---|
| JP | 2009-136109 A | 6/2009 |
| JP | 2012-182879 A | 9/2012 |
| WO | 2012/160665 A1 | 11/2012 |
| WO | 2015/121852 A1 | 8/2015 |

* cited by examiner

| VEHICLE INFORMATION | · VEHICLE TYPE (EV, PHV)<br>· CURRENT POSITION<br>· DESTINATION<br>· ESTIMATED TIME OF ARRIVAL<br>· SOC (%)<br>· ELECTRICITY COST (km/kWh)<br>· ELECTRIC QUANTITY NEEDED FOR REACHING DESTINATION<br>· CHARGING SCHEDULE<br>· EXTERNAL CHARGING PRIORITY<br>· REQUESTED AMOUNT OF CHARGING AT DESTINATION<br>. . . |
|---|---|

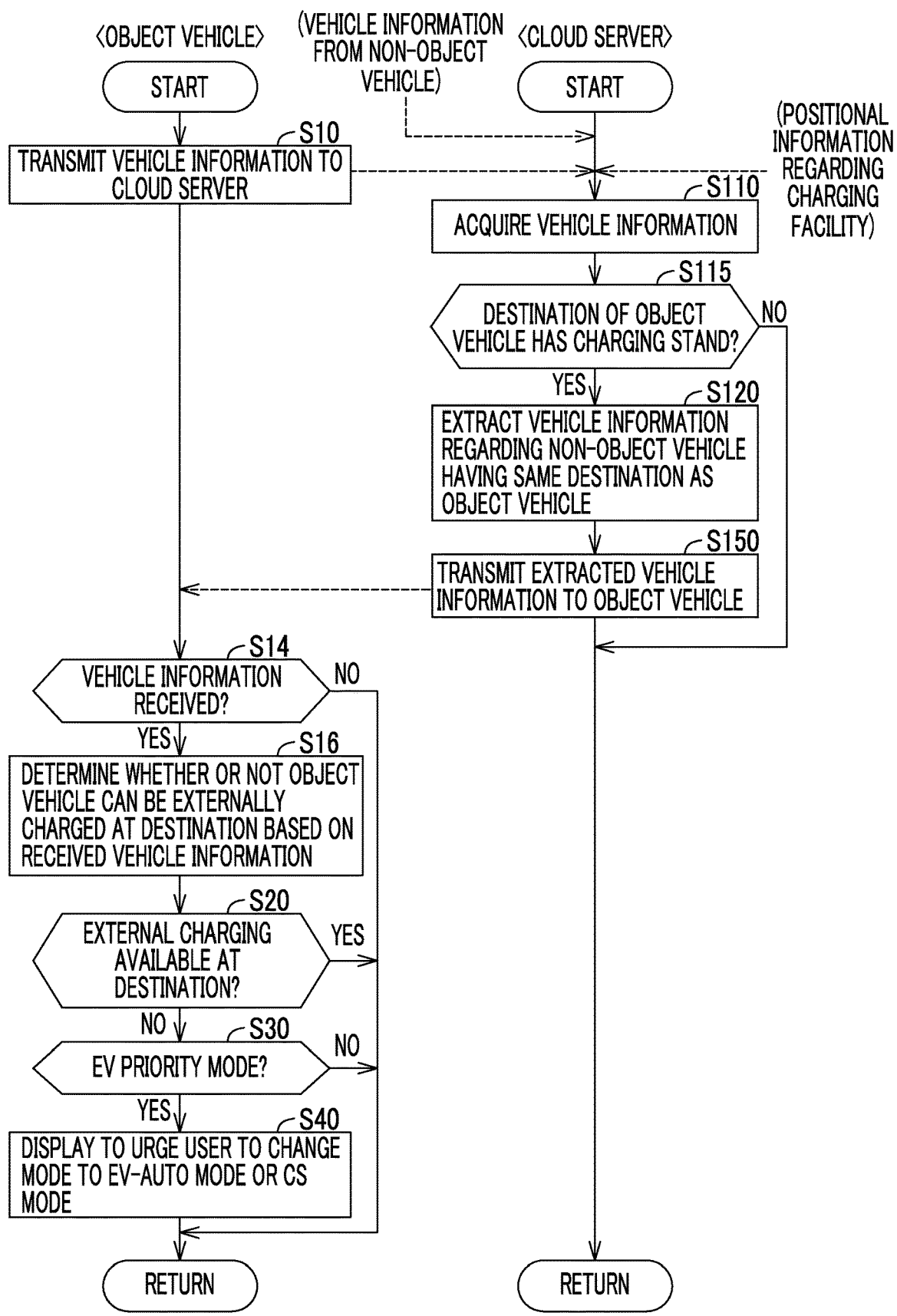

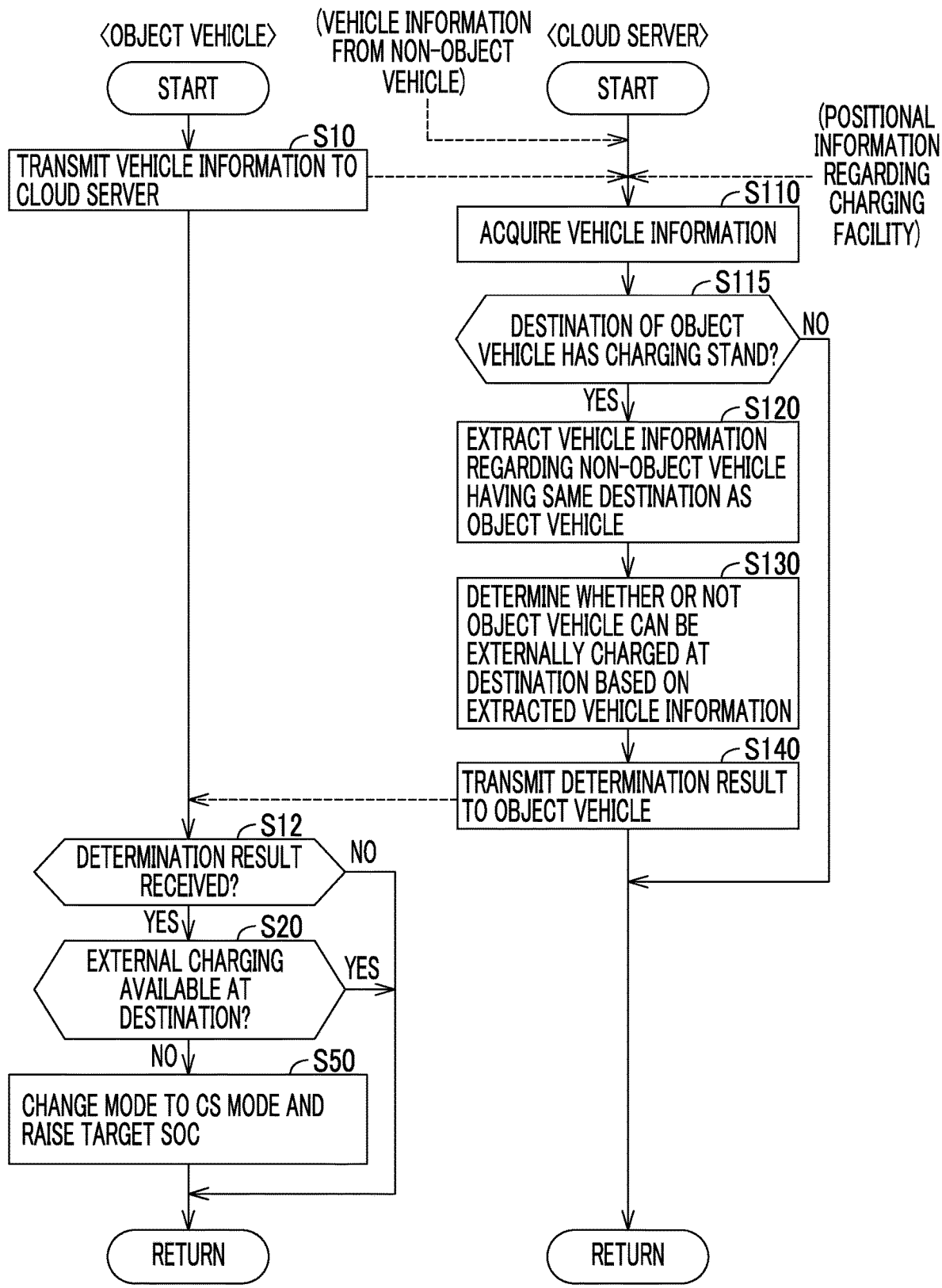

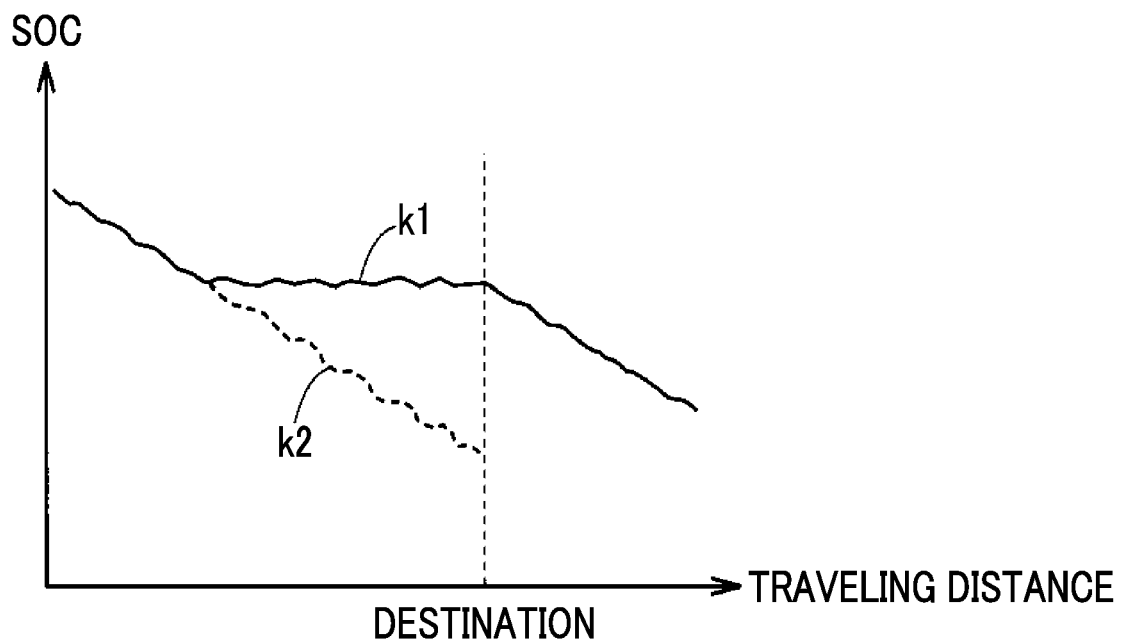

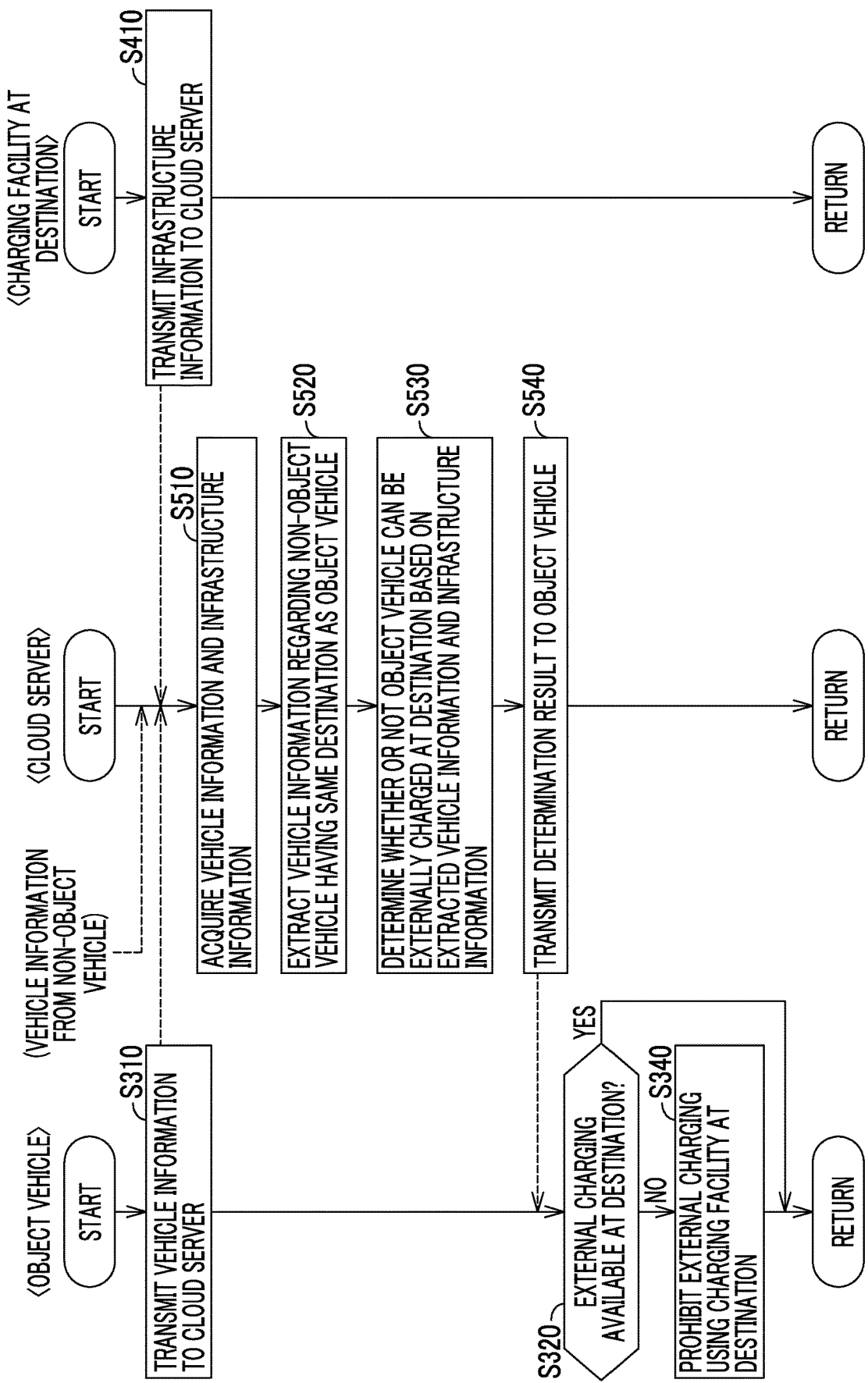

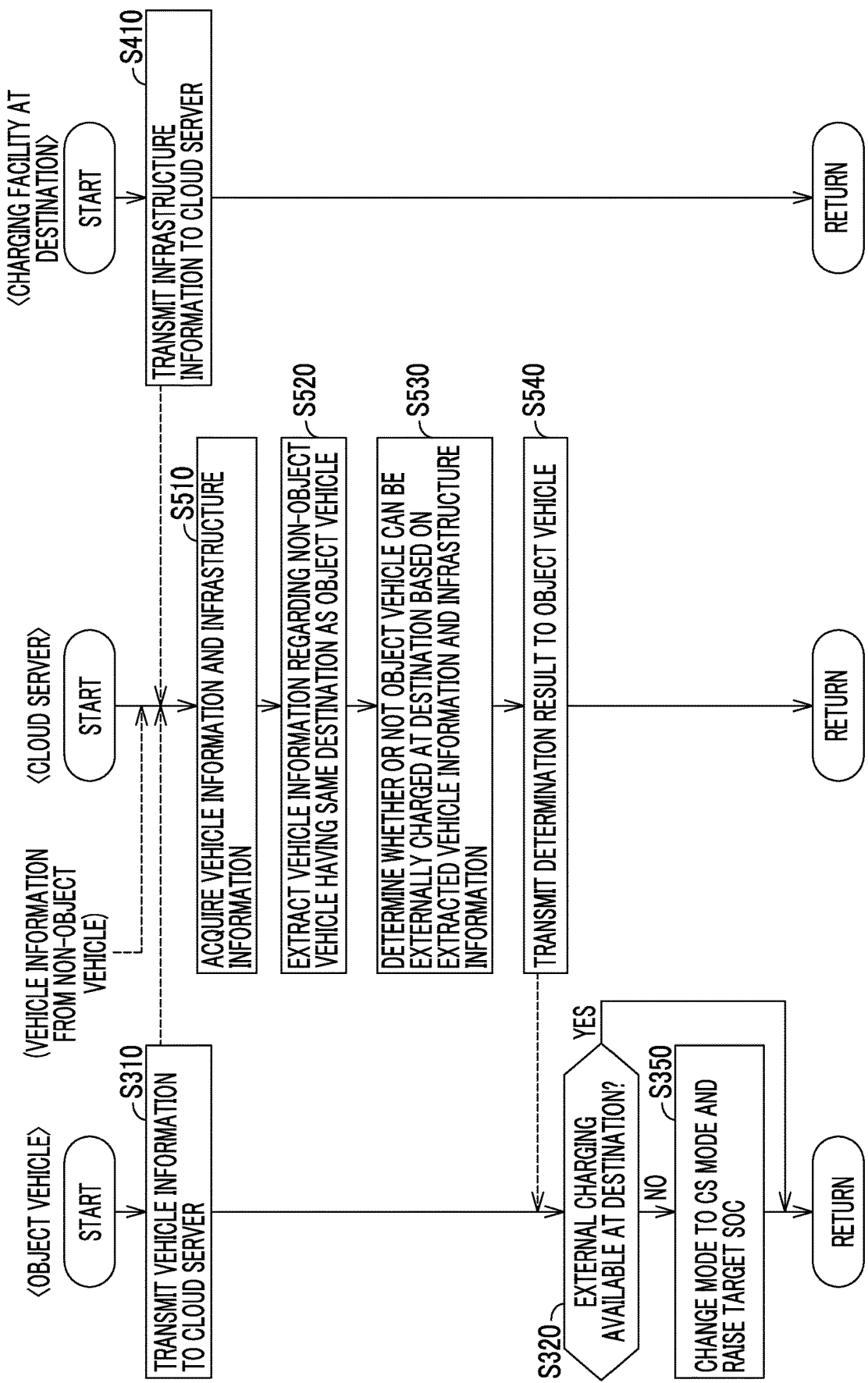

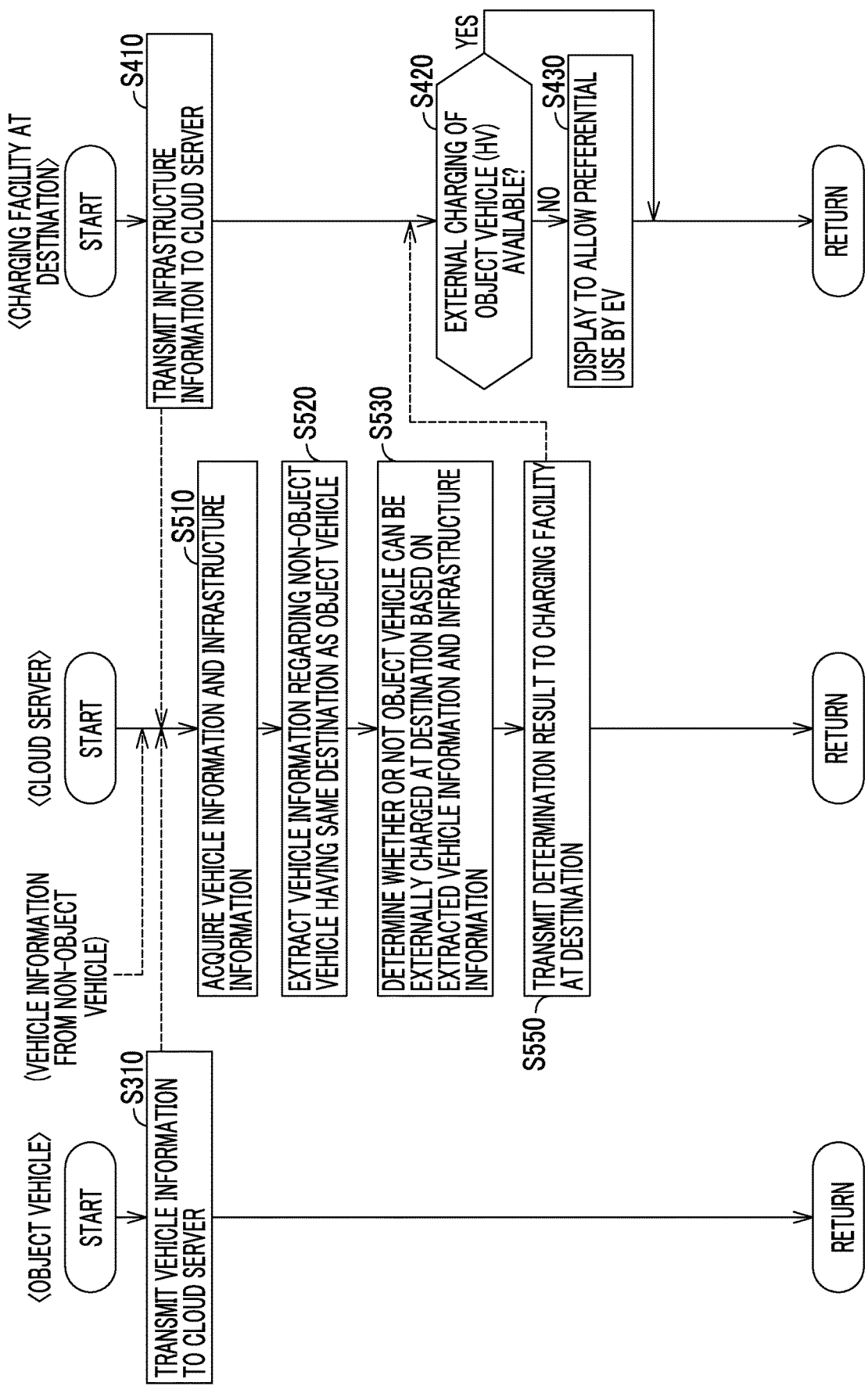

CONTROL DEVICE FOR HYBRID VEHICLE AND CONTROL METHOD FOR HYBRID VEHICLE

INCORPORATION BY REFERENCE

The disclosure of Japanese Patent Application No. 2016-245354 filed on Dec. 19, 2016 including the specification, drawings and abstract is incorporated herein by reference in its entirety.

BACKGROUND

1. Technical Field

The present disclosure relates to a control device for a hybrid vehicle and a control method for a hybrid vehicle and, more particularly, to a control device and a control method for controlling a hybrid vehicle provided with an internal combustion engine, an electric motor configured to generate a driving force for the hybrid vehicle, and an electric power storage device configured to be capable of being charged by a power source outside the vehicle.

2. Description of Related Art

Japanese Unexamined Patent Application Publication No. 2008-100646 (JP 2008-100646 A) discloses a hybrid vehicle that is configured to be capable of being externally charged. The target remaining capacity of the battery of the hybrid vehicle is reduced in a case where the battery of the hybrid vehicle is scheduled to be externally charged at a destination. Then, the amount by which the hybrid vehicle is externally charged at the destination can be increased. As a result, fuel economy can be improved by fuel consumption being suppressed (refer to JP 2008-100646 A).

SUMMARY

In a case where a plurality of vehicles that can be externally charged heads to the same destination which has a charging facility, competition may occur over the use of the charging facility at the destination. Various problems arise as follows when the availability of the external charging becomes clear after arrival at the destination. For example, desired energy management may not be available for the hybrid vehicle when the fact that the hybrid vehicle cannot be externally charged after arriving at the destination becomes clear. This is because energy management for the vehicle following departure from the destination (on its way back, for example) can be performed (section of EV traveling based solely on electricity can be appropriately set, for example) on the assumption that the level of the state of charge (SOC) of the electric power storage device becomes higher than usual by the external charging being performed at the destination of the vehicle. A situation may also arise in which, for example, an electric vehicle (EV) that is not provided with an internal combustion engine and has a higher external charging priority than the hybrid vehicle (HV) provided with an internal combustion engine and capable of performing HV traveling (hybrid traveling) by using the internal combustion engine cannot be externally charged at the destination.

The present disclosure provides a control device and a control method for a hybrid vehicle allowing a determination on the availability of external charging at a destination to be made before arrival at the destination.

A first aspect of the present disclosure relates to a control device for a hybrid vehicle provided with an internal combustion engine, an electric motor configured to generate a driving force for the hybrid vehicle and an electric power storage device configured to be capable of being charged by a power source outside the vehicle. The control device includes an acquisition unit, a determination unit, and a controller. The acquisition unit is configured to acquire a plurality of pieces of vehicle information regarding a vehicle configured to be externally charged. The vehicle information includes information related to a destination of the vehicle. The determination unit is configured to determine whether or not the hybrid vehicle is externally charged at the destination based on at least one piece of vehicle information among the plurality of pieces of the vehicle information acquired by the acquisition unit. The at least one piece of the vehicle information is information regarding a same-destination vehicle including at least one of a vehicle having the same destination as the hybrid vehicle and a vehicle that has arrived at the destination of the hybrid vehicle. The controller is configured to control the hybrid vehicle in accordance with a result of the determination by the determination unit.

In the control device according to the first aspect of the present disclosure, the vehicle information may further include vehicle type information indicating whether the vehicle is a vehicle not provided with the internal combustion engine or a vehicle provided with the internal combustion engine and SOC information indicating a state of charge (SOC) of the electric power storage device of the vehicle. The determination unit may be configured to determine whether or not the hybrid vehicle is to be externally charged at the destination by using the vehicle type information and the SOC information regarding the same-destination vehicle.

According to the first aspect of the present disclosure, the hybrid vehicle is capable of letting the same-destination vehicle use a charging facility first at the destination in a case where, for example, the same-destination vehicle is an electric vehicle (EV) having a higher external charging priority than the hybrid vehicle. In addition, whether or not the same-destination vehicle is externally charged at the destination can be determined based on the SOC information.

In the control device according to the first aspect of the present disclosure, the vehicle information may further include charging priority information indicating priority of the vehicle to be externally charged by the power source. The determination unit may be configured to determine whether or not the hybrid vehicle is externally charged at the destination based on the charging priority information regarding the same-destination vehicle.

The charging priority information is information capable of indicating the degree of necessity of the external charging at the destination. According to the first aspect of the present disclosure, the hybrid vehicle is capable of, for example, letting the vehicle higher in external charging priority use the charging facility first at the destination or, in a case where the hybrid vehicle competes with a vehicle having a lower external charging priority than the hybrid vehicle, the hybrid vehicle can be externally charged at the destination.

In the control device according to the first aspect of the present disclosure, the vehicle information may further include charging amount information indicating a requested amount of charging the vehicle by the power source at the destination. The determination unit may be configured to determine whether or not the hybrid vehicle is externally charged at the destination based on the charging amount information regarding the same-destination vehicle.

According to the first aspect of the present disclosure, the electric power demand at the destination can be forecast based on the charging amount information regarding the same-destination vehicle, and thus whether or not the hybrid vehicle can be externally charged at the destination can be determined by, for example, comparison between the electric power demand at the destination and the electric power supply capacity of the charging facility.

In the control device according to the first aspect of the present disclosure, the vehicle information may further include time of arrival of the vehicle having the same destination as the hybrid vehicle at the destination. The determination unit may be configured to determine whether or not the hybrid vehicle is externally charged at the destination based on a difference between time of arrival of the hybrid vehicle at the destination and the time of arrival of the vehicle at the destination.

In the control device according to the first aspect of the present disclosure, the hybrid vehicle may be configured to select a first mode in which the electric power stored in the electric power storage device is consumed and a second mode in which consumption of the electric power is suppressed compared to the first mode in accordance with a request from a user. The controller may be configured to execute processing to notify the user of switching from the first mode to the second mode when the first mode remains selected in a case where the determination unit determines that the hybrid vehicle is not externally charged.

According to the first aspect of the present disclosure, the stat of charge of the electric power storage device can be kept in preparation for the unavailability of the external charging at the destination once the second mode is selected by the user in accordance with the notification.

In the control device according to the first aspect of the present disclosure, the controller may be configured to control the SOC, such that the level of the SOC of the electric power storage device at the destination of the hybrid vehicle is higher than in a case where the determination unit determines that the hybrid vehicle is to be externally charged, in a case where the determination unit determines that the hybrid vehicle is not to be externally charged.

In the control device according to the first aspect of the present disclosure, the controller may be configured to execute predetermined control, such that the internal combustion engine is started with greater ease than in a case where the determination unit determines that the hybrid vehicle is to be externally charged, in a case where the determination unit determines that the hybrid vehicle is not to be externally charged.

According to the first aspect of the present disclosure, the level of the SOC can be made higher than usual before the arrival at the destination in preparation for the unavailability of the external charging at the destination.

In the control device according to the first aspect of the present disclosure, the predetermined control to facilitate the starting of the internal combustion engine may be configured to include at least one of (i) making the level of a target state of charge of the electric power storage device higher than usual, (ii) making a starting threshold of the internal combustion engine lower than usual, and (iii) increasing charging request power with respect to the electric power storage device.

In the control device according to the first aspect of the present disclosure, the acquisition unit may be configured to further acquire infrastructure information related to the charging facility at the destination of the hybrid vehicle. The determination unit may be configured to determine whether or not the hybrid vehicle is externally charged at the destination by using the infrastructure information along with the vehicle information regarding the same-destination vehicle.

According to the first aspect of the present disclosure, the determination unit determines whether or not the hybrid vehicle can be externally charged at the destination by using the infrastructure information regarding the destination along with the vehicle information. Accordingly, even when fluctuations occur in the amount of available electric power at the destination and the availability of the charging stand at the destination, the determination on the availability of the charging can be made with a high level of precision in view of the fluctuations.

In the control device according to the first aspect of the present disclosure, the infrastructure information may include reservation information indicating a reservation for using the charging facility. The determination unit may be configured to determine whether or not the hybrid vehicle is externally charged at the destination by using the reservation information along with the vehicle information regarding the same-destination vehicle.

According to the first aspect of the present disclosure, the determination on the availability of the charging can be made with a higher level of precision in view of the situation regarding the reservation for using the charging facility at the destination.

In the control device according to the first aspect of the present disclosure, the controller may be configured to execute processing to notify the user of the hybrid vehicle of refraining from using the charging facility in a case where the determination unit determines that the hybrid vehicle is not to be externally charged.

In the control device according to the first aspect of the present disclosure, the controller may be configured to execute processing to prohibit the hybrid vehicle from being externally charged by the charging facility being used in a case where the determination unit determines that the hybrid vehicle is not to be externally charged.

According to the first aspect of the present disclosure, the vehicles other than the hybrid vehicle can be allowed to use the charging facility with the determination made by the determination unit that the hybrid vehicle cannot be externally charged at the destination.

The control device according to the first aspect of the present disclosure may further include a notification unit disposed at the charging facility, the notification unit performing notification for the vehicle not provided with the internal combustion engine to use the charging facility in a case where the determination unit determines that the hybrid vehicle is not to be externally charged.

According to the first aspect of the present disclosure, the notification unit is disposed at the charging facility, and thus the charging facility can be preferentially used by the EV having a higher external charging priority than the hybrid vehicle.

A second aspect of the present disclosure relates to a control method for a hybrid vehicle provided with an internal combustion engine, an electric motor configured to generate a driving force for a hybrid vehicle, and an electric power storage device configured to be capable of being charged by a power source outside the vehicle, and supplying electric power to the electric motor. The control method includes acquiring vehicle information regarding the vehicle configured to be externally charged. The vehicle information includes information related to a destination of the vehicle.

The control method further includes determining whether or not the hybrid vehicle is externally charged at the destination based on pieces of vehicle information regarding a same-destination vehicle including at least one of a vehicle having the same destination as the hybrid vehicle and a vehicle that has arrived at the destination of the hybrid vehicle among the acquired vehicle information and controlling the hybrid vehicle in accordance with a result of the determination.

According to the first aspect and the second aspect of the present disclosure, the determination on whether or not the hybrid vehicle can be externally charged at the destination is made based on the vehicle information regarding the vehicle having the same destination as the hybrid vehicle (same-destination vehicle) being used and the hybrid vehicle is controlled in accordance with the result of the determination. Accordingly, various measures can be taken for the hybrid vehicle before the arrival at the destination in a case where the determination unit determines that the external charging cannot be performed at the destination. For example, a measure such as making the level of the SOC higher than usual before the arrival at the destination can be taken in advance in preparation for the unavailability of the external charging at the destination. As a result, energy management considering vehicle traveling after the vehicle reaches the destination (on its way back, for example) can be achieved.

The determination unit may be disposed in a device outside the hybrid vehicle (such as a cloud server) or may be disposed in the hybrid vehicle. In addition, the determination described above may be executed by a device outside the hybrid vehicle (such as a cloud server) or may be executed by the hybrid vehicle.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 7 is a flowchart illustrating an example of processing procedures executed by the ECU of the object vehicle and the management device of the cloud server according to a modification example;

FIG. 8 is a flowchart illustrating an example of processing procedures executed by an ECU of an object vehicle and a management device of a cloud server according to a second embodiment;

FIG. 9 is a diagram illustrating an example of a transition of an SOC of the object vehicle;

FIG. 10 is a diagram illustrating an example of infrastructure information regarding a destination that is acquired by the cloud server;

FIG. 13 is a flowchart illustrating an example of processing procedures executed by an ECU of an object vehicle, a management device of a cloud server, and the charging facility at a destination according to a fourth embodiment;

FIG. 14 is a flowchart illustrating an example of processing procedures executed by an ECU of an object vehicle, a management device of a cloud server, and the charging facility at a destination according to a fifth embodiment; and FIG. 15 is a flowchart illustrating an example of processing procedures executed by an ECU of an object vehicle, a management device of a cloud server, and the charging facility at a destination according to a sixth embodiment.

DETAILED DESCRIPTION OF EMBODIMENTS

Figure 1:
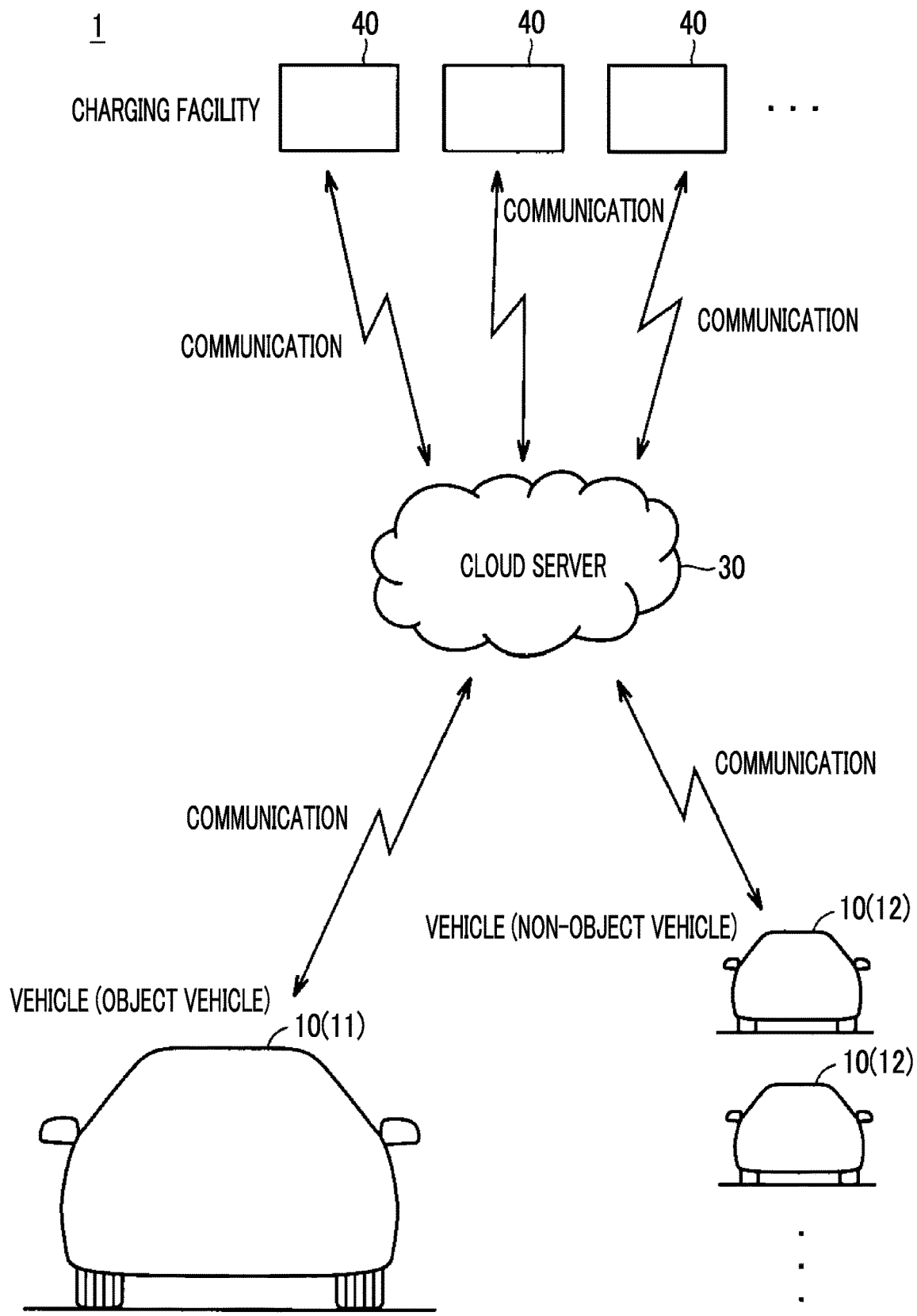
FIG. 1 is a diagram schematically illustrating an example of an overall configuration of a vehicle control system according to a first embodiment.

Hereinafter, embodiments of the present disclosure will be described in detail with reference to accompanying drawings. The same reference numerals will be used to refer to the same or equivalent parts of the drawings so that the same description is not repeated.

First Embodiment

FIG. 1 is a diagram schematically illustrating an example of an overall configuration of a vehicle control system according to a first embodiment. Referring to FIG. 1, a vehicle control system 1 is provided with a plurality of vehicles 10, a cloud server 30, and at least one charging stand 40.

Each of the vehicles 10 is a so-called connected vehicle. Each of the vehicles 10 is configured to be capable of wirelessly communicating with the cloud server 30. Each of the vehicles 10 transmits various types of information to the cloud server 30 at a predetermined cycle (every tens of seconds or so, for example). Examples of the information include the current position of the vehicle and its destination. Hereinafter, the information will be referred to as "vehicle information" as well. The content of the vehicle information will be described in detail later.

In the following description, the vehicle 10 that is controlled according to the present disclosure will be referred to as an "object vehicle 11" as well and each of the vehicles 10 other than the object vehicle 11 will be referred to as a "non-object vehicle 12" as well. The object vehicle 11 is a hybrid vehicle (such as a so-called plug-in hybrid vehicle (PHV)) that is provided with an engine and a motor for traveling, and its electric power storage device that supplies electric power to the motor can be externally charged. The type of the non-object vehicle 12 is not particularly limited insofar as it is a vehicle that has an electric power storage device which supplies electric power to its motor for traveling and can be externally charged. The non-object vehicle 12 may be an HV that can be externally charged or may be an EV that has no engine.

The charging stand 40 is a public facility that can be used by an unspecified large number of users. The charging stand 40 has an electric power supply facility for the vehicles 10 to be externally charged. The charging stand 40 is configured to be capable of wirelessly communicating with the cloud server 30. The charging stand 40 is capable of transmitting the availability of the charging stand 40, positional information regarding the charging stand 40, and so on to the cloud server 30.

The cloud server 30 acquires the vehicle information from each of the vehicles 10 (object vehicle 11 and non-object vehicles 12). The cloud server 30 accumulates the acquired vehicle information in a stratified manner for each of the vehicles 10. In addition, the cloud server 30 is configured to be capable of transmitting, to the object vehicle 11, predetermined data needed for the control of the object vehicle 11. Specific processing in each of the cloud server 30 acquiring the vehicle information from each of the vehicles 10 and the object vehicle 11 receiving the data from the cloud server 30 will be described in detail later.

Figure 2:
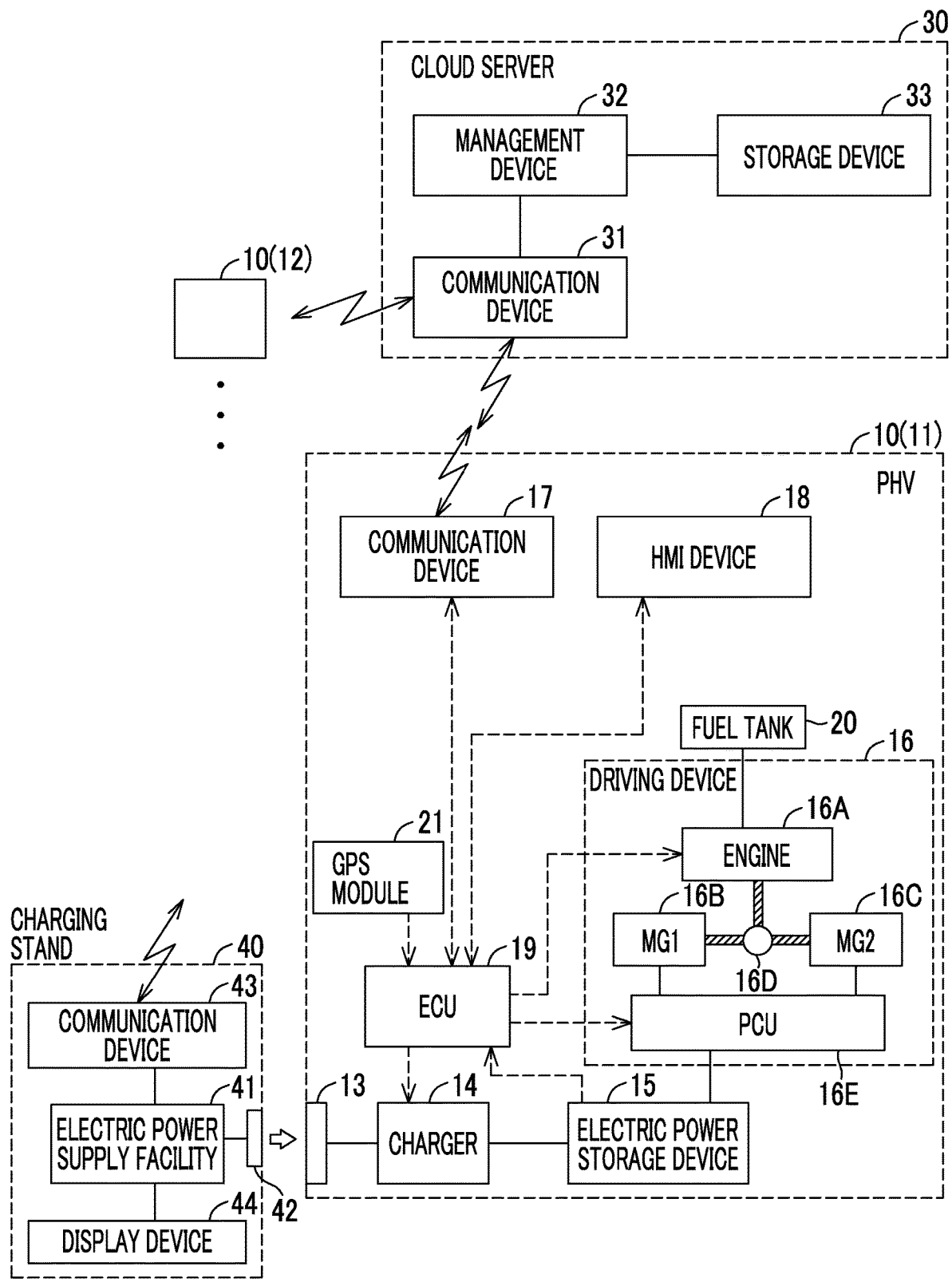
FIG. 2 is a diagram in which an example of the configuration of a vehicle, a cloud server, and a charging stand is illustrated in further detail.

FIG. 2 is a diagram in which an example of the configuration of the vehicle 10, the cloud server 30, and the charging stand 40 is illustrated in further detail. Referring to FIG. 2, the vehicle 10 (object vehicle 11) is provided with an inlet 13, a charger 14, an electric power storage device 15, a driving device 16, a communication device 17, a human machine interface (HMI) device 18, an electronic control unit (ECU) 19, a fuel tank 20, and a global positioning system (GPS) module 21.

The inlet 13 is configured to be capable of being connected to a connector 42 of the charging stand 40. The charger 14 converts the electric power that is input from the inlet 13 to a voltage level of the electric power storage device 15 and outputs it to the electric power storage device 15.

The electric power storage device 15 is a rechargeable direct current power source. The electric power storage device 15 is configured to include a secondary battery such as a lithium ion battery and a nickel hydrogen battery. The electric power storage device 15 is charged by receiving the electric power from the charger 14 during the execution of the external charging. The electric power storage device 15 is charged by receiving the electric power that is generated by the driving device 16 as well. Then, the electric power storage device 15 supplies the driving device 16 with the electric power that is stored in the electric power storage device 15. The electric power storage device 15 may be a large-capacitance capacitor.

The driving device 16 generates a driving force for the vehicle 10. In a case where the vehicle 10 is an HV (object vehicle 11 is an HV), the driving device 16 includes an engine 16A, a first motor generator (MG) 16B, a second MG 16C, a power split device 16D, and a power control unit (PCU) 16E.

The engine 16A is an internal combustion engine such as a gasoline engine and a diesel engine. The engine 16A generates power by being operated in response to fuel supply from the fuel tank 20. The power that is generated by the engine 16A is split into a path for power transmission to drive wheels (not illustrated) and a path for power transmission to the first MG 16B by the power split device 16D.

The first MG 16B and the second MG 16C are three-phase alternating current rotary electric machines driven by the PCU 16E. The first MG 16B generates electric power by using the power of the engine 16A that is received via the power split device 16D. The second MG 16C generates the driving force of the vehicle 10 by using at least one of the electric power that is stored in the electric power storage device 15 and the electric power that is generated by the first MG 16B. In addition, the second MG 16C performs regenerative electric power generation by using the kinetic energy of the vehicle 10 transmitted from the drive wheels during braking of the vehicle and coasting in an accelerator OFF state (state where the user of the vehicle does not step on the accelerator pedal of the vehicle). The regenerative electric power that is generated by the second MG 16C is recovered to the electric power storage device 15.

The power split device 16D is configured to include a planetary gear mechanism mechanically connecting the engine 16A, the first MG 16B, and the second MG 16C to one another. The PCU 16E converts the electric power that is stored in the electric power storage device 15 to alternating current electric power by which the first MG 16B and the second MG 16C can be driven. In addition, the PCU 16E converts the alternating current electric power that is generated by the first MG 16B and the second MG 16C to the charging electric power of the electric power storage device 15.

In a case where the vehicle 10 (non-object vehicle 12) is an EV that has no engine, a configuration that is not provided with the engine 16A (and the fuel tank 20), the first MG 16B, and the power split device 16D constitutes the driving device 16. In other words, the driving device 16 is configured to include the second MG 16C and the PCU 16E.

The communication device 17 is configured to be capable of wirelessly communicating with a communication device 31 of the cloud server 30. The communication device 17 is connected to the ECU 19 by a communication line. The communication device 17 transmits the vehicle information received from the ECU 19 to the cloud server 30 and outputs the data received from the cloud server 30 to the ECU 19.

The HMI device 18 is a device that provides the user with various types of information related to the vehicle 10 and receives user operations. The HMI device 18 includes, for example, a display and a speaker disposed in the cabin of the vehicle.

The GPS module 21 is a receiving device that is used in a satellite positioning system. The GPS module 21 calculates the current position of the vehicle 10 based on a received signal and outputs the result of the calculation to the ECU 19. The HMI device 18 and the GPS module 21 may be incorporated into a navigation device provided with a map database.

The vehicle 10 is also provided with a plurality of sensors (not illustrated). The sensors detect various physical quantities needed for the control of the vehicle 10. The sensors include a vehicle speed sensor that detects the speed of the vehicle, monitoring sensors that detect the states (voltage, current, temperature, and so on) of the electric power storage device 15, and an acceleration sensor that detects the acceleration of the vehicle 10. Each of the sensors outputs a detection result to the ECU 19.

The ECU 19 includes, for example, a central processing unit (CPU, not illustrated), a read-only memory (ROM, not illustrated) storing a processing program and so on, a random access memory (RAM, not illustrated) temporarily storing data, and input and output ports (not illustrated) allowing various types of signals to be input and output. The ECU 19 controls each of the devices including the charger 14, the driving device 16, the communication device 17, and the HMI device 18 based on, for example, the information stored in the memories (ROM and RAM) and the information from the various sensors.

The cloud server 30 is provided with the communication device 31, a management device 32, and a storage device 33. The communication device 31 is configured to be capable of wirelessly communicating with the communication device 17 of the vehicle 10 and a communication device 43 of the charging stand 40. The communication device 31 is connected to the management device 32 by a communication line. The communication device 31 outputs the vehicle information that is received from each of the vehicles 10 and the information that is received from the charging stand 40 to the management device 32 and transmits the data that is received from the management device 32 to the vehicle 10.

With the vehicle information acquired at a predetermined cycle from each of the vehicles 10 (object vehicle 11 and non-object vehicles 12), the storage device 33 stores the vehicle information in a stratified manner, for each of the vehicles 10, and in association with the ID of each of the vehicles 10. A hard disk drive (HDD) or the like constitutes the storage device 33.

The management device 32 includes, for example, a CPU (not illustrated), a ROM (not illustrated) storing a processing program and so on, a RAM (not illustrated) temporarily storing data, and input and output ports (not illustrated) allowing various types of signals to be input and output. The management device 32 executes various types of data processing by using the vehicle information regarding each of the vehicles 10 acquired from each of the vehicles 10 and stored in the storage device 33. In the first embodiment, the management device 32 uses, for example, the vehicle information regarding the non-object vehicle 12 that has the same destination as the object vehicle 11 among the acquired pieces of the vehicle information regarding the vehicles 10, determines the availability of the external charging of the object vehicle 11 at the destination by using the vehicle information, and transmits the result of the determination to the object vehicle 11 (refer to FIG. 5, which will be described later).

The charging stand 40 is provided with an electric power supply facility 41, the connector 42, the communication device 43, and a display device 44. The electric power supply facility 41 supplies electric power for external charging to the vehicle 10 connected to the connector 42. The electric power supply facility 41 is configured to include an electric power converter (such as an inverter and a converter), a circuit breaker, and so on. The electric power converter is used for the electric power for external charging to be generated.

The communication device 43 is configured to be capable of wirelessly communicating with the communication device 31 of the cloud server 30. The communication device 43 transmits the availability of the charging stand 40, the positional information regarding the charging stand 40, and so on to the cloud server 30. The communication device 43 may also be configured to be capable of wirelessly communicating with the communication device 17 of the vehicle 10 that is within its communication coverage. The display device 44 displays various types of information related to the charging stand 40. The display device 44 may be configured to include a touch panel that is capable of receiving user operations entailed by the external charging.

Description of Vehicle Information

In the vehicle control system 1, the vehicle information is transmitted at a predetermined cycle from each of the vehicles 10 to the cloud server 30 and the vehicle information regarding each of the vehicles 10 acquired by the cloud server 30 is accumulated in the storage device 33 in a stratified manner for each of the vehicles 10 as described above.

Figures 3, 4:
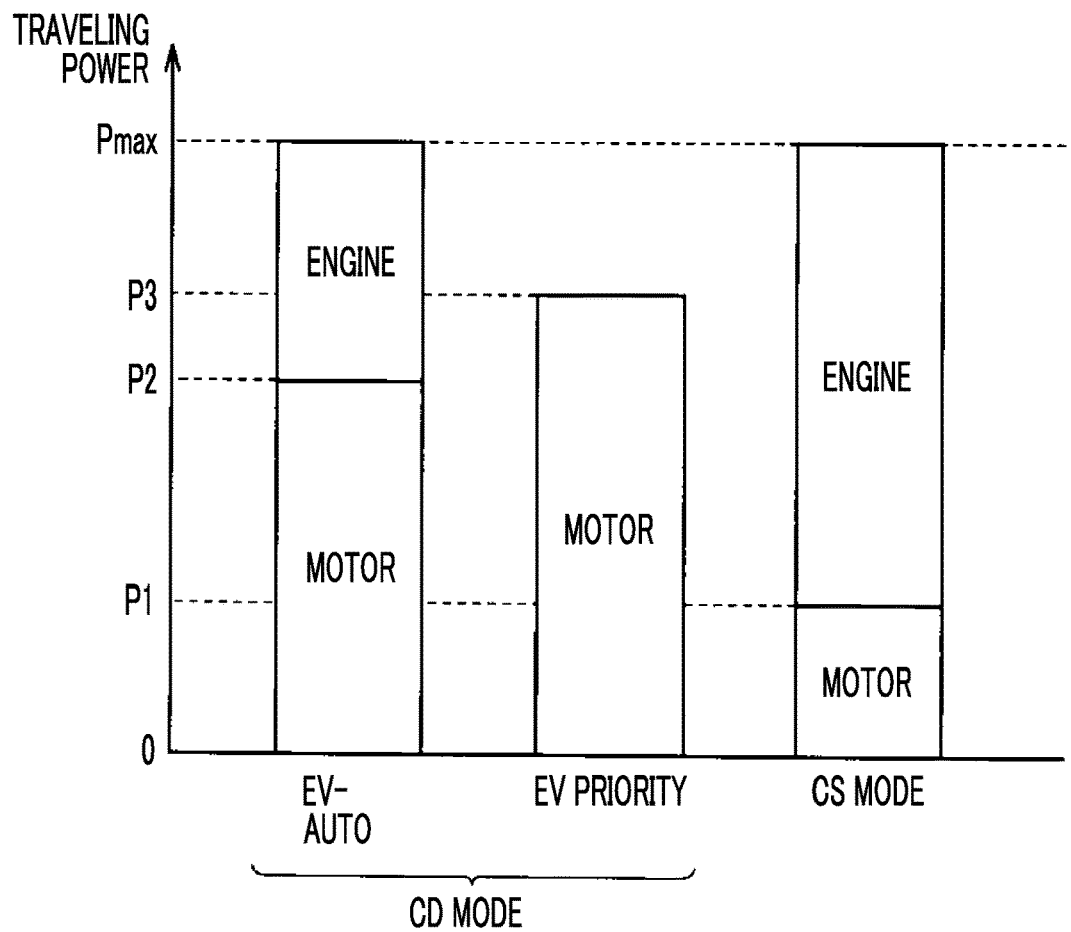
FIG. 3 is a diagram illustrating an example of vehicle information regarding each vehicle that is acquired by the cloud server.
FIG. 4 is a diagram schematically illustrating an example of traveling power at a time when each control mode is selected and an example of the source that generates the traveling power.

FIG. 3 is a diagram illustrating an example of the vehicle information regarding each of the vehicles 10 that is acquired by the cloud server 30. Referring to FIG. 3, the vehicle information includes, for example, "vehicle type", "current position", "destination", "estimated time of arrival", "SOC (%)", "electricity cost (km/kWh)", "electric quantity needed for reaching destination", "charging schedule", "external charging priority", and "requested amount of charging at destination".

The "vehicle type" is information indicating, for example, whether the vehicle is an EV that has no engine or an HV (such as a PHV) that is capable of receiving electric power from the outside. The "current position" is information indicating the current position of the vehicle. The current position of the vehicle is calculated by the GPS module 21 as described above.

The "destination" is information indicating the location of the destination of the vehicle. The destination of the vehicle can be set by a destination setting operation being performed on the HMI device 18, setting means (not illustrated) other than the HMI device 18, or the like. Examples of the setting means include a navigation device in a case where the navigation device is disposed separately from the HMI device 18.

The "estimated time of arrival" is the estimated time of arrival of the vehicle at the set destination. The estimated time of arrival at the destination can be calculated by, for example, the traveling distance from the current position to the destination being divided by the latest average speed of the vehicle.

The "SOC (%)" is information indicating the current SOC value of the electric power storage device 15 of the vehicle. The SOC is indicated by a value that shows the current electric power storage amount of the electric power storage device 15 with respect to the fully charged state of the electric power storage device 15 on a percentage basis. The SOC can be calculated by various known methods and based on, for example, the input and output current and the output voltage of the electric power storage device 15.

The "electricity cost (km/kWh)" is a value indicating the traveling distance of the vehicle per unit electric energy. The electricity cost can be calculated by various known methods, as well. The "electric quantity needed for reaching destination" is the electric quantity that is needed in a case where EV traveling is to be performed until the set destination is reached. An SOC amount needed for reaching destination, for example, may take the place of the "electric quantity needed for reaching destination". The "charging schedule" is a schedule for the external charging of the vehicle and includes information such as the charging time at the set destination.

The "external charging priority" is information capable of indicating the degree of necessity of the external charging at the set destination. The "external charging priority" is information set in the form of, for example, the priority being high in the case of EV, the priority being moderate when either the SOC or the amount of the remaining fuel is ensured in the case of HV, and the priority being low when both the SOC and the amount of the remaining fuel are sufficient in the case of HV. The "external charging priority" may be capable of being set by the user or may be automatically set based on the SOC, the amount of the remaining fuel, and so on.

The "requested amount of charging at destination" is a requested charging electric power amount regarding the external charging at the set destination. The requested amount of charging at the destination may be capable of being set by the user or may be calculated based on, for example, the capacity of the electric power storage device, the current SOC, the electric quantity needed for reaching the destination, and a target SOC during the external charging.

Description of Vehicle Control Modes

The control modes of the vehicle 10 will be described below. The ECU 19 of the vehicle 10 selects either a first mode or a second mode and controls the driving device 16 (engine 16A, PCU 16E, and so on) in accordance with the selected mode. In the embodiment, the first mode is a charge depleting (CD) mode and the second mode is a charge sustaining (CS) mode. Examples of the former include an EV priority mode and examples of the latter include an EV-AUTO mode and the CS mode.

The CD mode is a control mode in which the SOC of the electric power storage device 15 is consumed. In other words, basically, the electric power that is stored in the electric power storage device 15 (mainly the electric energy resulting from the external charging) is consumed in the CD mode. When the selected mode is the CD mode, operation of the engine 16A for the SOC to be maintained is not performed. Accordingly, the SOC gradually decreases as a whole in the end as the proportion of discharging exceeds the proportion of charging although the SOC may temporarily increase as a result of, for example, the regenerative electric power of the second MG 16C during the deceleration of the vehicle.

The CS mode is a control mode in which the SOC is maintained within a predetermined range. When the selected mode is the CS mode, the SOC is maintained within the predetermined range by the engine 16A being operated once the SOC declines and the engine 16A being stopped once the SOC rises. In other words, in the CS mode, the engine 16A is operated for the SOC to be maintained.

As an example, the ECU 19 selects the CD mode once the external charging is executed. Then, the ECU 19 maintains the CD mode as the selected mode until the SOC of the electric power storage device 15 reaches a predetermined value as a result of decline and selects the CS mode after the SOC reaches the predetermined value as a result of the decline.

In the first embodiment, two different modes, that is, the EV-AUTO mode and the EV priority mode, are prepared as the CD mode for the object vehicle 11. The user can select either the EV-AUTO mode or the EV priority mode with the CD mode selected by performing a mode selection operation with respect to the HMI device 18, a mode selection switch (not illustrated), or the like. In addition, the user can switch between the CD mode (EV-AUTO mode and EV priority mode) and the CS mode by performing the mode selection operation described above (switching from the CS mode to the CD mode is performed on condition that the level of the SOC is higher than a predetermined range).

FIG. 4 is a diagram schematically illustrating an example of traveling power at a time when each control mode is selected and an example of the source that generates the traveling power. Referring to FIG. 4, the traveling power is generated by the second MG 16C in a case where requested power is less than an engine starting threshold P1 in the CS mode and the traveling power is generated by the second MG 16C and the engine 16A in a case where the requested power is equal to or greater than the engine starting threshold P1 in the CS mode. In the CS mode, the engine 16A is started for the SOC to be maintained once the SOC falls below the predetermined range. The upper limit traveling power in the CS mode is set to a predetermined value Pmax.

In the EV-AUTO mode, the operation of the engine 16A is allowed as in the case of the CS mode. However, an engine starting threshold P2 in the EV-AUTO mode is set to a value that exceeds the engine starting threshold P1 in the CS mode. As a result, the region of traveling by the second MG 16C (EV traveling region) is wider in the EV-AUTO mode than in the CS mode. Specifically, the traveling power is generated by the second MG 16C in a case where the requested power is less than the engine starting threshold P2 and the traveling power is generated by the second MG 16C and the engine 16A in a case where the requested power is equal to or greater than the engine starting threshold P2. The upper limit traveling power in the EV-AUTO mode is set to the predetermined value Pmax as in the case of the CS mode.

In the EV priority mode, operation of the engine 16A for the traveling power to be obtained is not allowed and the upper limit traveling power is set to a predetermined value P3, which exceeds the engine starting threshold P2 in the EV-AUTO mode. Accordingly, in the EV priority mode, the traveling power is generated by the second MG 16C within a range below the predetermined value P3, and the engine 16A is not operated even when the requested power is equal to or greater than the predetermined value P3.

The engine 16A is operated, even in the EV-AUTO mode (CD mode), in a case where the requested power is equal to or greater than the engine starting threshold. The engine 16A is stopped, even in the CS mode, once the SOC rises. In other words, the EV-AUTO mode is not limited to the EV traveling performed with the engine 16A constantly stopped and the CS mode is not limited to the HV traveling performed with the engine 16A in operation all the way. The EV traveling and the HV traveling can be performed in the EV-AUTO mode and the CS mode alike.

Description of Determination on Availability of External Charging at Destination and Control of Object Vehicle 11

In a case where the vehicles 10 (including the object vehicle 11) head to the same destination that has the charging stand 40, competition may occur over the use of the charging stand 40 at the destination. The following problems arise when the availability of the external charging becomes clear after the arrival at the destination.

For example, desired energy management may not be available for an HV such as the object vehicle 11 when the fact that the external charging cannot be performed after the arrival at the destination becomes clear. This is because energy management for the vehicle following departure from the destination (on its way back, for example) can be performed (EV traveling section can be appropriately set, for example) on the assumption that the level of the SOC of the electric power storage device 15 becomes higher than usual by the external charging being performed at the destination of the vehicle. A situation may also arise in which, for example, an EV having a higher external charging priority than the HV capable of performing the HV traveling by using the engine 16A, such as the object vehicle 11, cannot be externally charged at the destination.

In the first embodiment, the vehicle information regarding each of the vehicles 10 (including the object vehicle 11) is collected by the cloud server 30 as described above and a determination on whether or not the object vehicle 11 can be externally charged at the destination is made in this regard by the vehicle information regarding the non-object vehicle 12 that has the same destination as the object vehicle 11 being used among the pieces of the vehicle information regarding the vehicles 10 acquired by the cloud server 30.

In a case where a determination that the object vehicle 11 cannot be externally charged at the destination is made as a result, a measure such as making the level of the SOC higher than usual before the arrival at the destination can be taken in advance in preparation for the unavailability of the external charging of the object vehicle 11 at the destination. As a result, energy management considering traveling beyond the destination (on its way back, for example) can be achieved for the object vehicle 11.

Specifically, in the first embodiment, a message to urge the user to change the mode of the object vehicle 11 from the EV priority mode to the EV-AUTO mode or the CS mode is displayed on the HMI device 18 in a case where a determination that the object vehicle 11 cannot be externally charged at the destination is made. In the EV priority mode, the EV traveling is performed and the engine 16A is not operated as illustrated in FIG. 4. Accordingly, in the EV priority mode, the SOC can be reduced earlier than in the EV-AUTO mode or the CS mode, in which the engine 16A can be operated. In the first embodiment, the user is urged in this regard to change the mode of the object vehicle 11 from the EV priority mode to the EV-AUTO mode or the CS mode so that a decline in the SOC before the arrival at the destination is further suppressed (the level of the SOC is higher than usual compared to a case where the EV priority mode remains selected).

Figure 5:
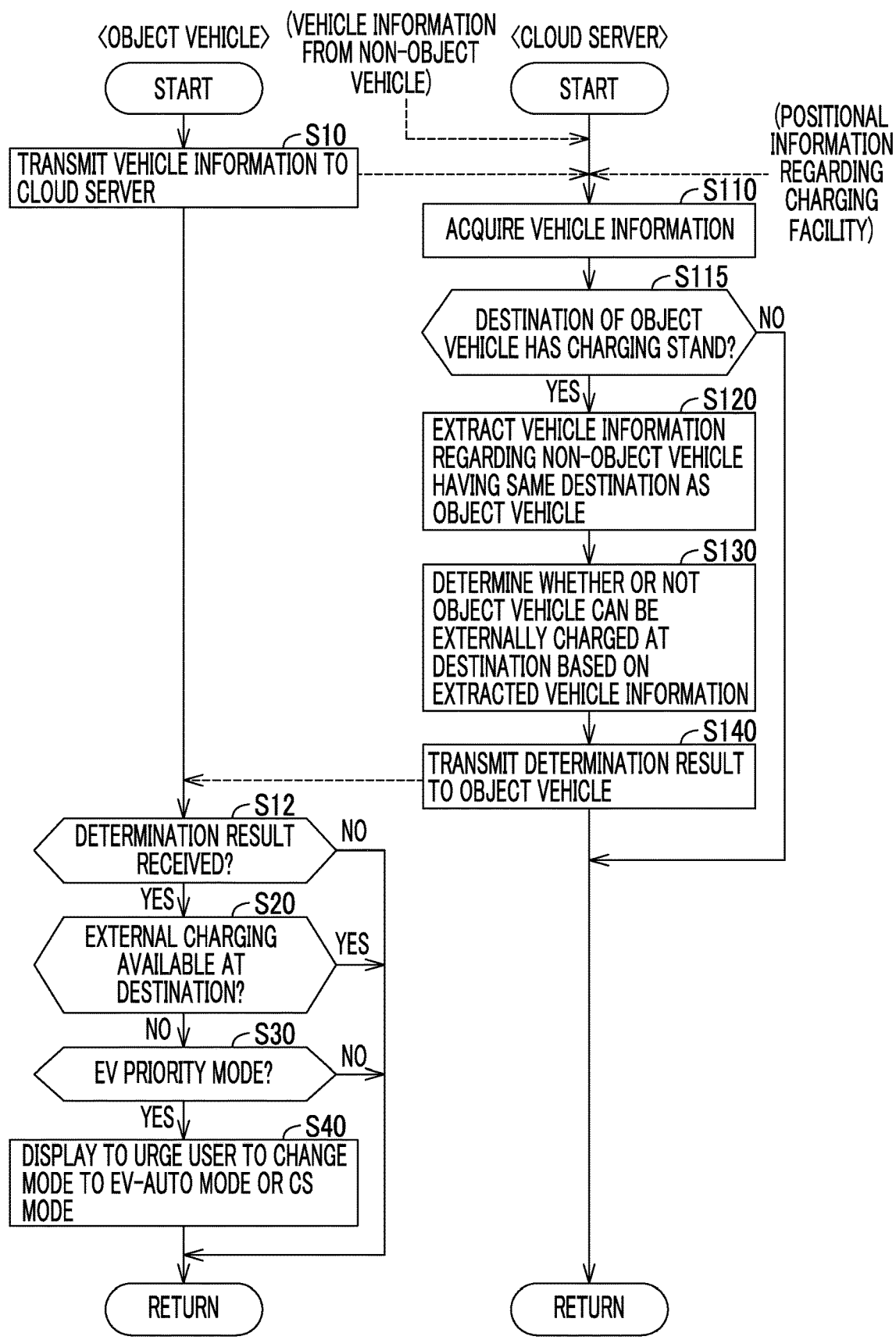
FIG. 5 is a flowchart illustrating an example of processing procedures executed by an ECU of an object vehicle and a management device of the cloud server.

FIG. 5 is a flowchart illustrating an example of processing procedures executed by the ECU 19 of the object vehicle 11 and the management device 32 of the cloud server 30. The processing sequence on the object vehicle 11 side is repeatedly executed at a predetermined cycle (every tens of seconds or so, for example). The processing sequence on the cloud server 30 side is repeatedly executed every time a predetermined condition is satisfied or at predetermined time intervals.

Referring to FIG. 5, the ECU 19 of the object vehicle 11 transmits the vehicle information regarding the object vehicle 11 (FIG. 3) to the cloud server 30 (Step S10). The cloud server 30 (management device 32) acquires the vehicle information from each of the vehicles 10 (Step S110). The vehicle information acquired by the cloud server 30 includes the vehicle information from each of the non-object vehicles 12 as well as the vehicle information from the object vehicle 11. The acquired vehicle information is stored in the storage device 33 in a stratified manner for each of the vehicles 10. The cloud server 30 also acquires the positional information regarding the charging facility (charging stand 40). The positional information is also stored in the storage device 33.

Then, the cloud server 30 determines (Step S115) whether or not the destination of the object vehicle 11 has the charging stand 40 by referring to the vehicle information regarding the object vehicle 11 acquired in Step S110 and based on the destination of the object vehicle 11 and the positional information regarding the charging facility. In the first embodiment, the destination has one charging stand 40.

Once the cloud server 30 determines that the destination has no charging stand 40 (NO in Step S115), the cloud server 30 allows the processing to proceed to "RETURN" without executing the following processing. Once the cloud server 30 determines in Step S115 that the destination of the object vehicle 11 has the charging stand 40 (YES in Step S115), the cloud server 30 extracts (Step S120), from the storage device 33, the vehicle information regarding all of the non-object vehicles 12 that have the same destination as the object vehicle 11.

Then, the cloud server 30 determines (Step S130), based on the vehicle information extracted in Step S120, whether or not the object vehicle 11 can be externally charged at the destination. The cloud server 30 determines whether or not the object vehicle 11 can be externally charged at the destination based on, for example, the vehicle type information and the SOC information that are included in the extracted vehicle information regarding the non-object vehicles 12. An example of the method for the determination will be described in detail later.

After the determination is executed in Step S130 on whether or not the object vehicle 11 can be externally charged at the destination, the cloud server 30 transmits the result of the determination to the object vehicle 11 (Step S140). Then, the cloud server 30 allows the processing to proceed to "RETURN".

On the part of the object vehicle 11, the vehicle information regarding the object vehicle 11 is transmitted to the cloud server 30 in Step S10, and then the ECU 19 determines (Step S12) whether or not the result of the determination on whether or not the object vehicle 11 can be externally charged at the destination has been received from the cloud server 30. In a case where the determination result is yet to be received from the cloud server 30 (NO in Step S12), the ECU 19 allows the processing to proceed to "RETURN" without executing the following processing.

Once the ECU 19 determines in Step S12 that the determination result has been received from the cloud server 30 (YES in Step S12), the ECU 19 determines (Step S20), based on the determination result, whether or not the external charging at the destination is available. When the external charging can be performed at the destination (YES in Step S20), the ECU 19 of the object vehicle 11 allows the processing to proceed to "RETURN" without executing the following processing.

Once the ECU 19 determines in Step S20 that the external charging at the destination cannot be performed (NO in Step S20), the ECU 19 determines (Step S30) whether or not the currently selected mode is the EV priority mode (FIG. 4). When the currently selected mode is the EV priority mode (YES in Step S30), the ECU 19 controls the HMI device 18 (Step S40) in order for the HMI device 18 to output display to urge the user to change the mode from the EV priority mode to the EV-AUTO mode or the CS mode. When the currently selected mode is not the EV priority mode (NO in Step S30), the ECU 19 allows the processing to proceed to "RETURN" without executing Step S40.

Although the processing of Step S30 and the processing of Step S40 are to urge the user to change the mode from the EV priority mode to the EV-AUTO mode or the CS mode so that a decline in the SOC before the arrival at the destination is further suppressed (the level of the SOC is higher than usual compared to a case where the EV priority mode remains selected), display to urge the user to change the mode to the CS mode may also be output for the same purpose in a case where the selected mode is the EV priority mode or the EV-AUTO mode (CD mode).

Figure 6:
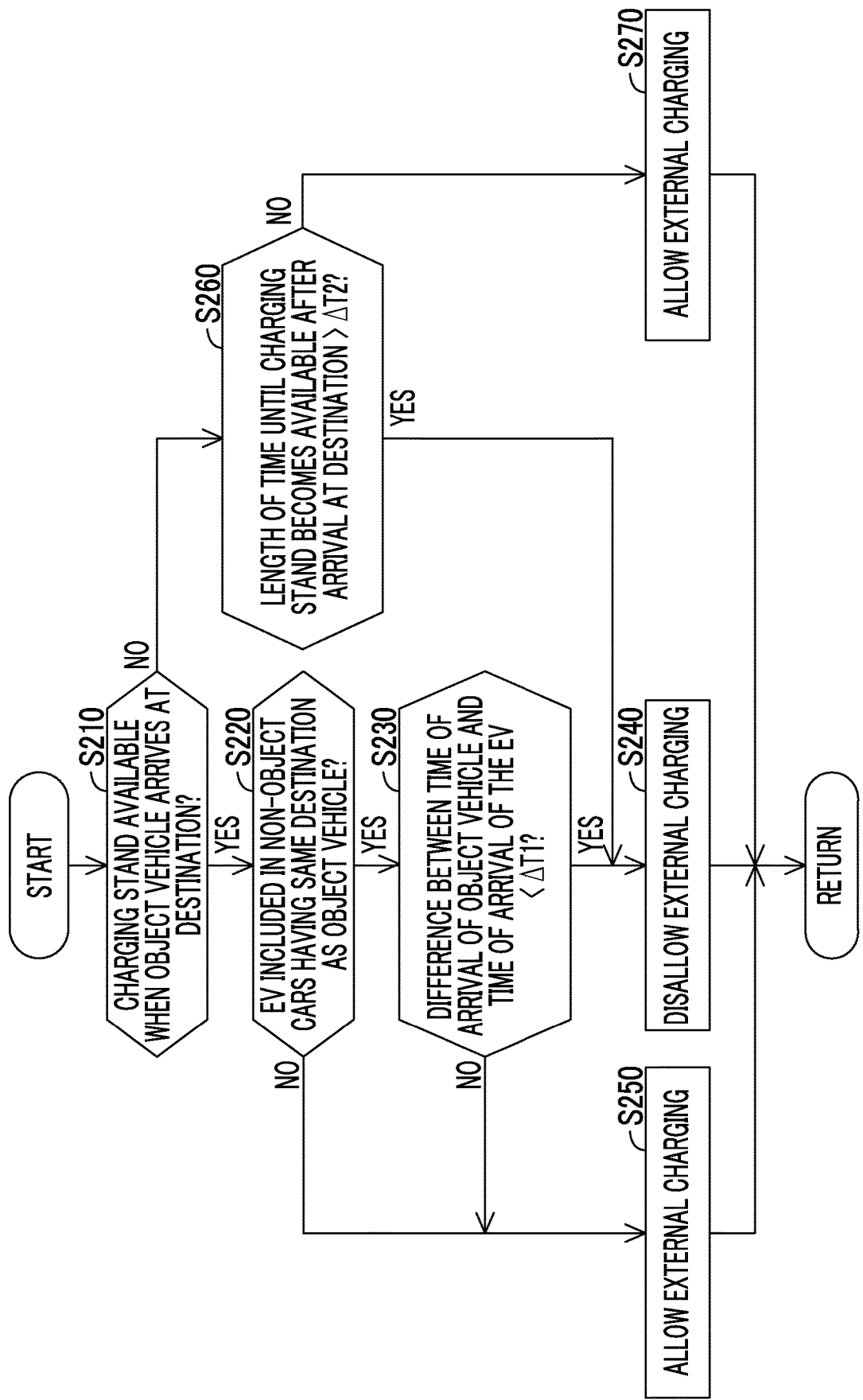
FIG. 6 is a flowchart illustrating an example of determination processing that is executed in Step S130 illustrated in FIG. 5.

FIG. 6 is a flowchart illustrating an example of the determination processing that is executed in Step S130 illustrated in FIG. 5. Referring to FIG. 6, the cloud server 30 (management device 32) determines (Step S210) whether or not the charging stand 40 at the destination is available when the object vehicle 11 arrives at the destination. This determination is made based on, for example, the estimated time of arrival and the SOC that are included in the vehicle information extracted in Step S120 illustrated in FIG. 5. The use of the charging stand 40 by the non-object vehicle 12 at the destination can be predicted as, for example, the execution and non-execution of the external charging at the destination can be predicted based on the SOC and the charging time at the destination can be predicted based on the estimated time of arrival and the SOC.

Once the cloud server 30 determines in Step S210 that the charging stand 40 is available when the object vehicle 11 arrives at the destination (YES in Step S210), the cloud server 30 determines (Step S220), based on the vehicle information extracted in Step S120 illustrated in FIG. 5, whether or not an EV is included in the non-object vehicles 12 that have the same destination as the object vehicle 11.

Once the cloud server 30 determines in Step S220 that an EV is included in the non-object vehicles 12 that have the same destination as the object vehicle 11 (YES in Step S220), the cloud server 30 determines (Step S230) whether or not the difference between the time of arrival of the object vehicle 11 and the time of arrival of the non-object vehicle 12 (EV) is shorter than a predetermined period of time ΔT1. Once the cloud server 30 determines that the difference between the time of arrival of the object vehicle 11 and the time of arrival of the non-object vehicle 12 (EV) is shorter than the predetermined period of time ΔT1 (YES in Step S230), the cloud server 30 disallows the external charging of the object vehicle 11 at the destination (Step S240) so that the charging stand 40 is preferentially used by the non-object vehicle 12 (EV).

The cloud server 30 allows the external charging of the object vehicle 11 at the destination (Step S250) in a case where the cloud server 30 determines in Step S220 that no EV is included in the non-object vehicles 12 that have the same destination as the object vehicle 11 (NO in Step S220) or in a case where the cloud server 30 determines in Step S230 that the difference between the time of arrival of the object vehicle 11 and the time of arrival of the non-object vehicle 12 (EV) is equal to or longer than the predetermined period of time ΔT1 (NO in Step S230).

Once the cloud server 30 determines in Step S210 that the charging stand 40 is unavailable when the object vehicle 11 arrives at the destination (NO in Step S210), the cloud server 30 determines (Step S260) whether or not the length of time until the charging stand 40 becomes available after the arrival of the object vehicle 11 at the destination is longer than a predetermined period of time ΔT2.

Once the cloud server 30 determines that the length of time until the charging stand 40 becomes available is longer than the predetermined period of time ΔT2 (YES in Step S260), the cloud server 30 allows the processing to proceed to Step S240 and disallows the external charging of the object vehicle 11 at the destination. Once the cloud server 30 determines in Step S260 that the length of time until the charging stand 40 becomes available is equal to or shorter than the predetermined period of time ΔT2 (NO in Step S260), the cloud server 30 allows the external charging of the object vehicle 11 at the destination (Step S270).

In Step S130 illustrated in FIG. 5, the determination on whether or not the object vehicle 11 can be externally charged at the destination may also be made by the "external charging priority" that is included in the vehicle information being used. For example, the cloud server 30 may determine that the object vehicle 11 cannot be externally charged at the destination in a case where the object vehicle 11 competes with the non-object vehicle 12 having a higher external charging priority than the object vehicle 11 for the external charging at the destination and may determine that the object vehicle 11 can be externally charged at the destination in a case where the object vehicle 11 competes with the non-object vehicle 12 having a lower external charging priority than the object vehicle 11 for the external charging at the destination. Then, the object vehicle 11 is capable of, for example, letting the non-object vehicle 12 higher in external charging priority use the charging facility before the object vehicle 11 uses the charging facility at the destination or, in a case where the object vehicle 11 competes with the non-object vehicle 12 having a lower external charging priority than the object vehicle 11, the object vehicle 11 can be externally charged at the destination.

In Step S130, the determination on whether or not the object vehicle 11 can be externally charged at the destination may also be made by the "requested amount of charging at destination" that is included in the vehicle information being used. For example, the cloud server 30 may calculate the amount of the electric power demand at the destination from the requested amount of charging of the object vehicle 11 and the requested amount of charging of the non-object vehicle 12 extracted in Step S120 (FIG. 5) and, in a case where the calculated amount of the electric power demand exceeds the electric power supply capacity of the charging facility at the destination, may determine whether or not the object vehicle 11 can be externally charged at the destination by, for example, considering the "external charging priority" described above as well. Then, the electric power demand at the destination can be forecast, and thus whether or not the object vehicle 11 can be externally charged at the destination can be determined by, for example, comparison between the electric power demand at the destination and the electric power supply capacity of the charging facility.

In the first embodiment, the vehicle information regarding each of the vehicles 10 (including the object vehicle 11) is collected by the cloud server 30 as described above and the determination on whether or not the object vehicle 11 can be externally charged at the destination is made by the vehicle information regarding the non-object vehicle 12 that has the same destination as the object vehicle 11 being used among the pieces of the vehicle information regarding the vehicles 10 acquired by the cloud server 30. As a result, in a case where a determination that the object vehicle 11 cannot be externally charged at the destination is made, various measures can be taken for the object vehicle 11 before the arrival at the destination in preparation for the unavailability of the external charging of the object vehicle 11 at the destination.

In the first embodiment, the message to urge the user to change the mode of the object vehicle 11 from the EV priority mode to the EV-AUTO mode or the CS mode is displayed on the HMI device 18 in a case where a determination that the object vehicle 11 cannot be externally charged at the destination is made. Once the EV-AUTO mode or the CS mode is selected by the user as a result, the level of the SOC at the destination can be made higher than usual compared to a case where the EV priority mode continues until the destination is reached. As a result, energy management considering its traveling beyond the destination (on its way back, for example) can be achieved for the object vehicle 11.

Modification Example

In the first embodiment described above, the cloud server 30 determines whether or not the object vehicle 11 can be externally charged at the destination based on the vehicle information regarding the non-object vehicle 12 that has the same destination as the object vehicle 11. In this modification example, the vehicle information regarding the non-object vehicle 12 that has the same destination as the object vehicle 11 is transmitted from the cloud server 30 to the object vehicle 11 and the object vehicle 11 determines whether or not the object vehicle 11 can be externally charged at the destination.

FIG. 7 is a flowchart illustrating an example of processing procedures executed by the ECU 19 of the object vehicle 11 and the management device 32 of the cloud server 30 according to the modification example. Referring to FIG. 7, the flowchart includes Step S14 and Step S16 instead of Step S12 in the flowchart according to the first embodiment that is illustrated in FIG. 5 and includes Step S150 instead of Step S130 and Step S140 in the flowchart according to the first embodiment that is illustrated in FIG. 5.

In other words, once the vehicle information regarding the non-object vehicle 12 that has the same destination as the object vehicle 11 is extracted from the storage device 33 in Step S120, the cloud server 30 (management device 32) transmits the extracted vehicle information to the object vehicle 11 (Step S150). Then, the cloud server 30 allows the processing to proceed to "RETURN".

After the vehicle information regarding the object vehicle 11 is transmitted from the object vehicle 11 to the cloud server 30 in Step S10, the ECU 19 determines (Step S14) whether or not the vehicle information regarding the non-object vehicle 12 that has the same destination as the object vehicle 11 has been received from the cloud server 30. When the vehicle information regarding the non-object vehicle 12 is yet to be received (NO in Step S14), the ECU 19 allows the processing to proceed to "RETURN".

Once the vehicle information regarding the non-object vehicle 12 is received (YES in Step S14), the ECU 19 determines (Step S16), based on the received vehicle information regarding the non-object vehicle 12, whether or not the object vehicle 11 can be externally charged at the destination. The content of the processing that is executed in Step S16 is basically identical to the determination processing that is executed in Step S130 illustrated in FIG. 5. For example, the processing that is illustrated in the flowchart in FIG. 6 is executed as the processing that is executed in Step S16.

After the determination is executed in Step S16 on whether or not the object vehicle 11 can be externally charged at the destination, the ECU 19 allows the processing to proceed to Step S20 and determines, based on the result of the determination, whether or not the external charging at the destination is available.

The processing of each step other than Step S14, Step S16, and Step S150 is as described with reference to FIG. 5.

Second Embodiment

In the first embodiment described above, the user is urged to change the control mode (from the EV priority mode to the EV-AUTO mode or the CS mode or from the EV priority mode or the EV-AUTO mode to the CS mode, Step S30 and Step S40 in FIG. 5) in a case where the ECU 19 determines that the object vehicle 11 cannot be externally charged at the destination (NO in Step S20 in FIG. 5). In a second embodiment, in contrast, the SOC is controlled, such that the SOC at the destination is higher than in a case where a determination that the external charging can be performed is made, in a case where a determination that the object vehicle 11 cannot be externally charged at the destination is made.

A vehicle control system according to the second embodiment is identical in basic configuration to the vehicle control system 1 described with reference to FIGS. 1 to 4.

FIG. 8 is a flowchart illustrating an example of processing procedures executed by the ECU 19 of the object vehicle 11 and the management device 32 of the cloud server 30 according to the second embodiment. Referring to FIG. 8, the flowchart includes Step S50 instead of Step S30 and Step S40 in the flowchart according to the first embodiment that is illustrated in FIG. 5.

In other words, once the ECU 19 determines in Step S20 that the object vehicle 11 cannot be externally charged at the destination (NO in Step S20), the ECU 19 of the object vehicle 11 changes the control mode to the CS mode and makes the level of the target SOC (SOC control range) in the CS mode higher than usual (Step S50). In a case where the ECU 19 determines in Step S20 that the object vehicle 11 can be externally charged at the destination (YES in Step S20), the ECU 19 allows the processing to proceed to "RETURN" without executing the processing of Step S50.

The processing that is executed in Step S50 is to make the level of the SOC higher than usual by allowing the engine 16A to be started with greater ease than in a case where a determination that the object vehicle 11 can be externally charged at the destination is made. Accordingly, the starting of the engine 16A may also be facilitated by, for example, a lower-than-usual starting threshold of the engine 16A or an increase in the charging request power with respect to the electric power storage device 15 instead of the above-described processing that results in a higher-than-usual level of the target SOC (SOC control range).

FIG. 9 is a diagram illustrating an example of the transition of the SOC of the object vehicle 11. The horizontal axis in FIG. 9 represents the traveling distance of the object vehicle 11. The transition of the SOC that precedes its arrival at the set destination and the transition of the SOC that follows its departure from the destination are illustrated in FIG. 9.

The solid line k1 in FIG. 9 represents the transition of the SOC in a case where a determination that the object vehicle 11 cannot be externally charged at the destination is made. The dotted line k2 in FIG. 9 represents the transition of the SOC that continues until the destination is reached in a case where the processing sequence according to the second embodiment that is illustrated in FIG. 8 is not executed according to a comparative example.

In a case where the destination is reached with the SOC declined and the external charging cannot be performed at the destination as shown by the dotted line k2, energy management such as keeping the SOC for traveling in the CD mode led by the EV traveling in a desired section (immediately after the departure from the destination, in the vicinity of one's house, and so on) cannot be performed although the HV traveling using the engine 16A can be performed subsequently.

In the second embodiment, the SOC is controlled such that the SOC at the destination increases, as shown by the solid line k1, in a case where a determination that no external charging can be performed at the destination is made before the object vehicle 11 arrives at the destination. Therefore, according to the second embodiment, the CD mode led by the EV traveling can be selected in the desired section that follows the departure from the destination (immediately after the departure from the destination, in the vicinity of one's house, and so on), and energy management considering its traveling that follows the departure from the destination can be achieved.

Third Embodiment

In each of the embodiments described above, the determination on whether or not the object vehicle 11 can be externally charged at the destination is made by the vehicle information regarding the non-object vehicle 12 that has the same destination as the object vehicle 11 being used. In a third embodiment, various types of information regarding the charging facility (hereinafter, also referred to as "infrastructure information") are transmitted from the charging facility at the destination to the cloud server 30 and the determination on whether or not the object vehicle 11 can be externally charged at the destination is made by the infrastructure information regarding the destination being used along with the vehicle information (the content of the infrastructure information will be described in detail later). As a result, the precision of the determination on whether or not the object vehicle 11 can be externally charged at the destination can be improved.

FIG. 10 is a diagram illustrating an example of the infrastructure information regarding the destination that is acquired by the cloud server 30. Referring to FIG. 10, the infrastructure information includes, for example, "number of charging stands", "availability", "schedule of use", "available electric power", "electric power price", "electric power $CO_2$", "failure information", and "reservation information".

The "number of charging stands" is information indicating the number of the charging stands 40 installed at the destination. The "availability" is information indicating the availability of each of the charging stands 40 installed at the destination. The "schedule of use" is information related to a reservation for using each of the charging stands 40. The "available electric power" is information indicating the electric power that can be supplied from each of the charging stands 40 during the external charging. When the charging stand 40 has a solar panel, for example, the "available electric power" may change depending on the weather.

The "electric power price" is information indicating the price of the electric power during the external charging at the charging stand 40. The "electric power $CO_2$" includes information such as the $CO_2$ emission factor of the electric power that is supplied from the charging stand 40. The "failure information" is information related to the failure of each of the charging stands 40. The "reservation information" is information indicating the reservation for using each of the charging stands 40. For example, each of the vehicles 10 is capable of communicating with the charging facility at the destination and is capable of reserving the charging stand 40 at the destination via, for example, the HMI device 18 (FIG. 2).

In the third embodiment, the cloud server 30 acquires the infrastructure information regarding the destination along with the vehicle information regarding each of the vehicles 10 (including the object vehicle 11) that can be externally charged and the determination on whether or not the object vehicle 11 can be externally charged at the destination is made by the vehicle information regarding the non-object vehicle 12 that has the same destination as the object vehicle 11 being used, among the pieces of the vehicle information regarding the vehicles 10 acquired by the cloud server 30, along with the infrastructure information regarding the destination.

A vehicle control system according to the third embodiment is identical in basic configuration to the vehicle control system 1 described with reference to FIGS. 1 to 4. In the vehicle control system according to the third embodiment, the infrastructure information is additionally transmitted to the cloud server 30 from the charging facility at the destination of the object vehicle 11 as described above.

Figure 11:
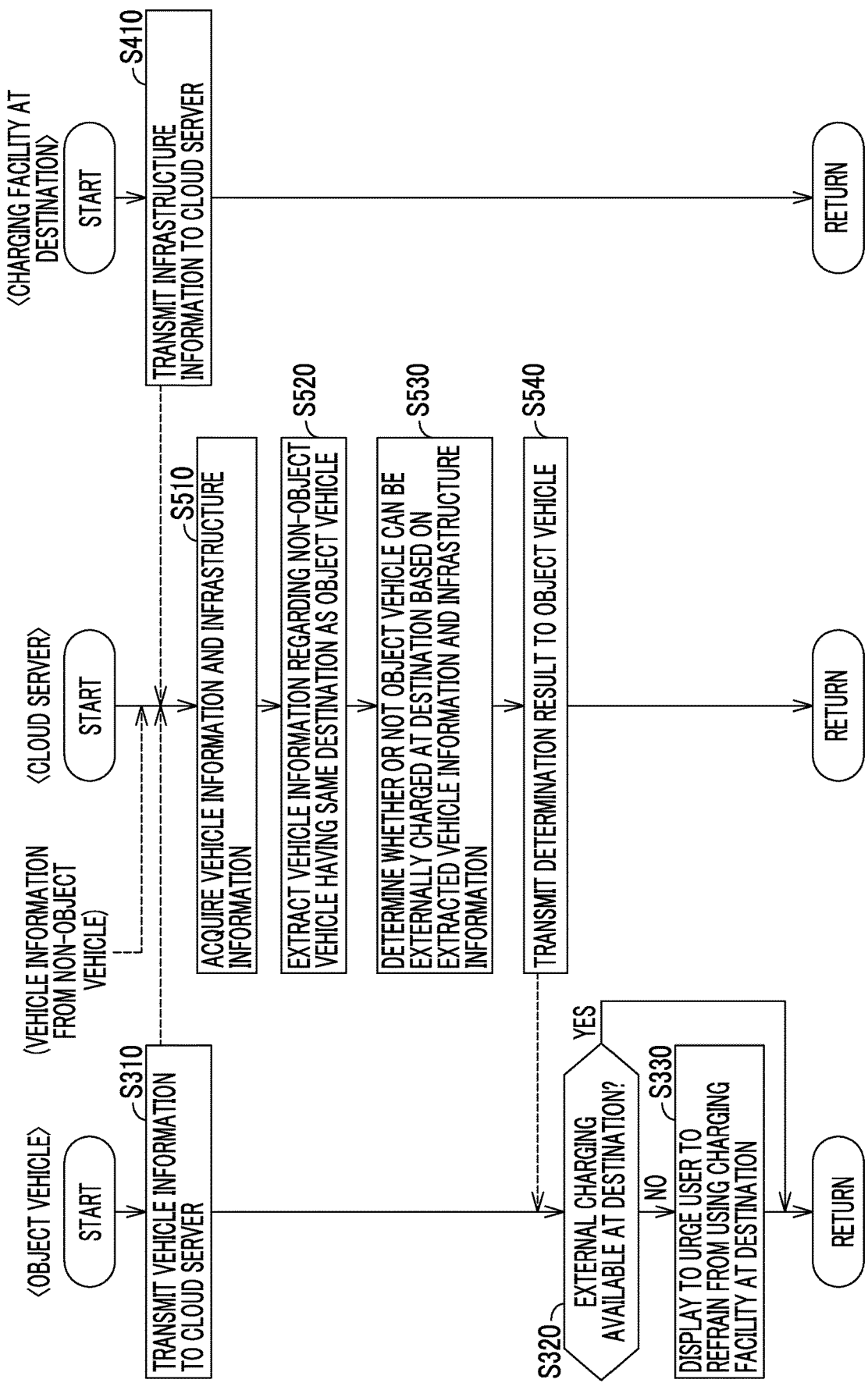
FIG. 11 is a flowchart illustrating an example of processing procedures executed by an ECU of an object vehicle, a management device of a cloud server, and a charging facility at a destination according to a third embodiment.

FIG. 11 is a flowchart illustrating an example of processing procedures executed by the ECU 19 of the object vehicle 11, the management device 32 of the cloud server 30, and the charging facility at the destination according to the third embodiment.

Referring to FIG. 11, the ECU 19 of the object vehicle 11 transmits the vehicle information regarding the object vehicle 11 (FIG. 3) to the cloud server 30 (Step S310). The vehicle information transmission is executed at a predetermined cycle (every tens of seconds or so, for example).

In addition, the charging facility at the destination of the object vehicle 11 transmits the infrastructure information regarding the charging facility (FIG. 10) to the cloud server 30 (Step S410). The infrastructure information transmission is executed at a predetermined cycle (every several minutes or so, for example), as well.

The cloud server 30 (management device 32) acquires the vehicle information from each of the vehicles 10 and acquires the infrastructure information from the charging facility at the destination of the object vehicle 11 (Step S510). The vehicle information acquired by the cloud server 30 includes the vehicle information from each of the non-object vehicles 12 as well as the vehicle information from the object vehicle 11. The acquired vehicle information is stored in the storage device 33 in a stratified manner for each of the vehicles 10. The acquired infrastructure information is stored in the storage device 33, as well.

Then, the cloud server 30 extracts (Step S520), from the storage device 33, the vehicle information regarding all of the non-object vehicles 12 that have the same destination as the object vehicle 11. Then, the cloud server 30 determines (Step S530), based on the extracted vehicle information and the infrastructure information regarding the destination of the object vehicle 11, whether or not the object vehicle 11 can be externally charged at the destination. The cloud server 30 determines whether or not the object vehicle 11 can be externally charged at the destination based on, for example, the availability of the charging stand 40 that is included in the infrastructure information regarding the destination and the vehicle type information and the SOC information that are included in the extracted vehicle information regarding the non-object vehicles 12. An example of the method for the determination will be described in detail later.

After the determination is executed in Step S530 on whether or not the object vehicle 11 can be externally charged at the destination, the cloud server 30 transmits the result of the determination to the object vehicle 11 (Step S540). Then, the cloud server 30 allows the processing to proceed to "RETURN".

On the part of the object vehicle 11, the vehicle information regarding the object vehicle 11 is transmitted to the cloud server 30 in Step S310, and then the ECU 19 determines (Step S320), based on the determination result received from the cloud server 30, whether or not the external charging at the destination is available. When the external charging can be performed at the destination (YES in Step S320), the ECU 19 allows the processing to proceed to "RETURN" without executing the following processing.

Once the ECU 19 determines in Step S320 that the external charging at the destination cannot be performed (NO in Step S320), the ECU 19 controls the HMI device 18 (Step S330) in order for the HMI device 18 to output display to urge the user to refrain from using the charging facility at the destination. As a result, it is possible to refrain the user from using the charging facility at the destination in a case where a determination that the external charging at the destination cannot be performed is made.

Figure 12:
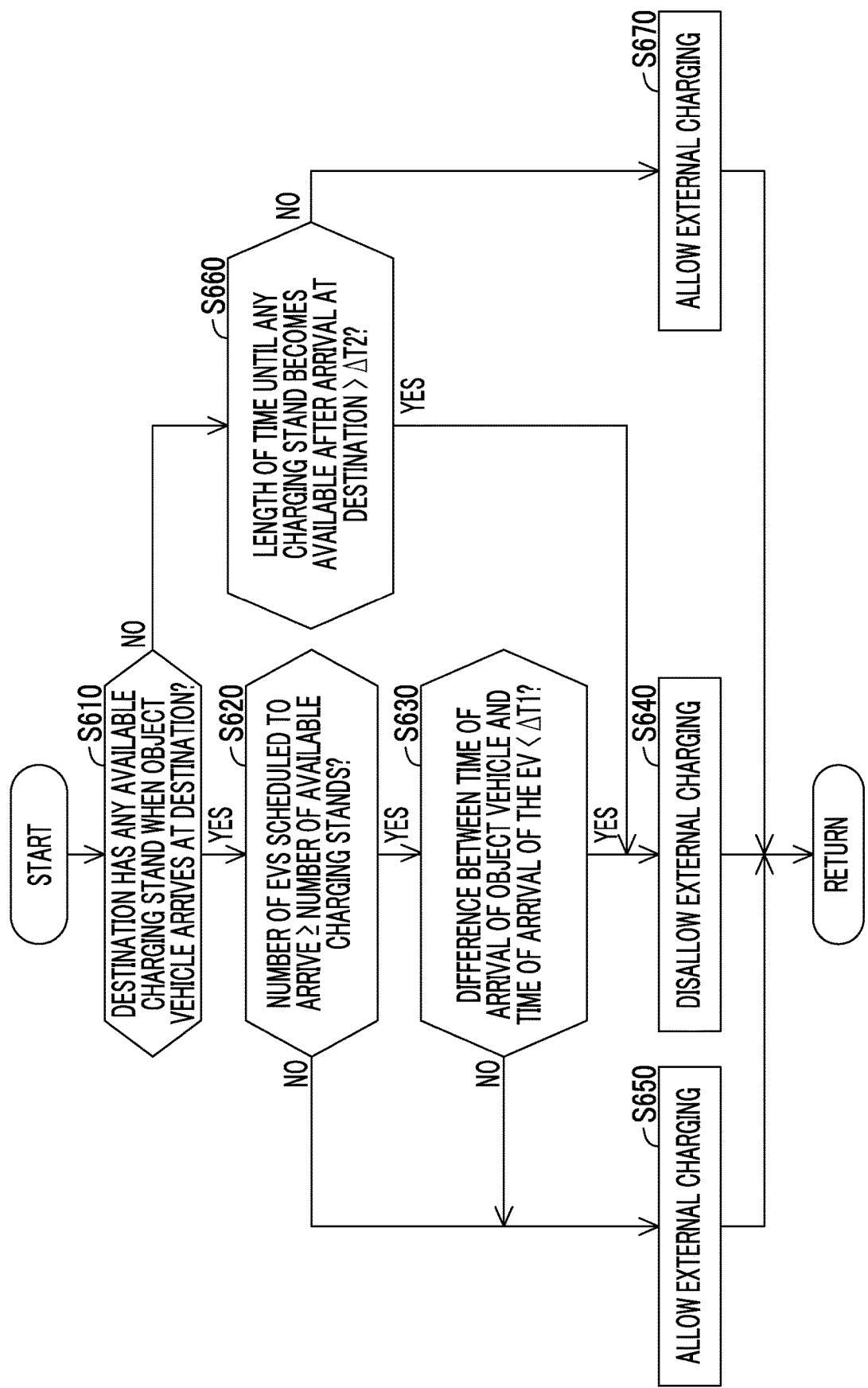
FIG. 12 is a flowchart illustrating an example of determination processing that is executed in Step S530 illustrated in FIG. 11.

FIG. 12 is a flowchart illustrating an example of the determination processing that is executed in Step S530 illustrated in FIG. 11. Referring to FIG. 12, the cloud server 30 (management device 32) determines (Step S610) whether or not the destination has any available charging stand 40 when the object vehicle 11 arrives at the destination. This determination can be made in view of, for example, the number of the charging stands and the availability that are included in the infrastructure information regarding the destination acquired in Step S510 illustrated in FIG. 11 and the estimated time of arrival and the SOC that are included in the vehicle information extracted in Step S520 illustrated in FIG. 11. The use of the charging stand 40 by the non-object vehicle 12 at the destination can be predicted with the number of the charging stands at the destination and the availability also taken into account as, for example, the execution and non-execution of the external charging at the destination can be predicted for each of the vehicles based on the SOC and the charging time at the destination can be predicted based on the estimated time of arrival and the SOC.

Once the cloud server 30 determines in Step S610 that the destination has any available charging stand 40 when the object vehicle 11 arrives at the destination (YES in Step S610), the cloud server 30 determines (Step S620), based on the vehicle information extracted in Step S520 in FIG. 11, whether or not the number of the non-object vehicles 12 that are EVs and head to the same destination as the object vehicle 11 is equal to or greater than the number of the available charging stands 40.

Once the cloud server 30 determines in Step S620 that the number of the EVs is equal to or greater than the number of the available charging stands 40 (YES in Step S620), the cloud server 30 determines (Step S630) whether or not the difference between the time of arrival of the object vehicle 11 and the time of arrival of the EV scheduled to arrive at the last one of the available charging stands 40 is shorter than the predetermined period of time ΔT1. Once the cloud server 30 determines that the difference between the time of arrival of the object vehicle 11 and the time of arrival of the EV scheduled to arrive at the last one of the available charging stands 40 is shorter than the predetermined period of time ΔT1 (YES in Step S630), the cloud server 30 disallows the external charging of the object vehicle 11 at the destination (Step S640) so that the charging stand 40 is preferentially used by the EV.

The cloud server 30 allows the external charging of the object vehicle 11 at the destination (Step S650) in a case where the cloud server 30 determines in Step S620 that the number of the EVs heading to the destination is less than the number of the available charging stands 40 (NO in Step S620) or in a case where the cloud server 30 determines in Step S630 that the difference between the time of arrival of the object vehicle 11 and the time of arrival of the EV scheduled to arrive at the last one of the available charging stands 40 is equal to or longer than the predetermined period of time ΔT1 (NO in Step S630).

Once the cloud server 30 determines in Step S610 that the destination has no available charging stand 40 when the object vehicle 11 arrives at the destination (NO in Step S610), the cloud server 30 determines (Step S660) whether or not the length of time until any one of the charging stands 40 becomes available after the arrival of the object vehicle 11 at the destination is longer than the predetermined period of time ΔT2.

Once the cloud server 30 determines that the length of time until any one of the charging stands 40 becomes available is longer than the predetermined period of time ΔT2 (YES in Step S660), the cloud server 30 allows the processing to proceed to Step S640 and disallows the external charging of the object vehicle 11 at the destination. Once the cloud server 30 determines in Step S660 that the length of time until any one of the charging stands 40 becomes available is equal to or shorter than the predetermined period of time ΔT2 (NO in Step S660), the cloud server 30 allows the external charging of the object vehicle 11 at the destination (Step S670).

In Step S530 illustrated in FIG. 9, the determination on whether or not the object vehicle 11 can be externally charged at the destination may also be made by the "reservation information" that is included in the infrastructure information being additionally used. For example, the cloud server 30 may determine that the object vehicle 11 cannot be externally charged at the destination in a case where the number of reservations for the use of the charging stands 40 already exceeds the number of the charging stands 40. Then, the determination on the availability of the charging can be made with a higher level of precision in view of the situation regarding the reservation for using the charging facility at the destination.

In the third embodiment, the infrastructure information is transmitted to the cloud server 30 from the charging facility at the destination of the object vehicle 11 as described above and the determination on whether or not the object vehicle 11 can be externally charged at the destination is made by the vehicle information regarding the non-object vehicle 12 being used along with the infrastructure information regarding the destination. As a result, the precision of the determination on whether or not the object vehicle 11 can be externally charged at the destination can be improved.

In the third embodiment, a message to urge the user to refrain the object vehicle 11 from using the charging facility is displayed on the HMI device 18 in a case where a determination that the object vehicle 11 cannot be externally charged at the destination is made. As a result, the vehicles other than the object vehicle 11 can be allowed to use the charging facility with the determination made that the external charging of the object vehicle 11 cannot be performed at the destination.

Fourth Embodiment

In the third embodiment, the user is urged to refrain from using the charging facility at the destination (Step S330 in FIG. 11) in a case where the ECU 19 determines that the object vehicle 11 cannot be externally charged at the destination (NO in Step S320 in FIG. 11). In the fourth embodiment, the external charging of the object vehicle 11 that is based on the use of the charging facility at the destination is prohibited in a case where a determination that the object vehicle 11 cannot be externally charged at the destination is made.

A vehicle control system according to the fourth embodiment is identical in basic configuration to the vehicle control system according to the third embodiment.

FIG. 13 is a flowchart illustrating an example of processing procedures executed by the ECU 19 of the object vehicle 11, the management device 32 of the cloud server 30, and the charging facility at the destination according to the fourth embodiment. Referring to FIG. 13, the flowchart includes Step S340 instead of Step S330 in the flowchart according to the third embodiment that is illustrated in FIG. 11.

In other words, once the ECU 19 determines in Step S320 that the object vehicle 11 cannot be externally charged at the destination (NO in Step S320), the ECU 19 of the object vehicle 11 prohibits the external charging using the charging facility at the destination (Step S340). For example, the ECU 19 prohibits the operation of the charger 14 (FIG. 1) at the destination or causes a charging relay (not illustrated) disposed on an electrical path that reaches the electric power storage device 15 from the inlet 13 to remain OFF.

In a case where the ECU 19 determines in Step S320 that the object vehicle 11 can be externally charged at the destination (YES in Step S320), the ECU 19 allows the processing to proceed to "RETURN" without executing the processing of Step S340.

In the fourth embodiment, the determination on whether or not the object vehicle 11 can be externally charged at the destination is made by the vehicle information being used along with the infrastructure information regarding the destination as in the third embodiment. As a result, the precision of the determination on whether or not the object vehicle 11 can be externally charged at the destination can be improved. In a case where a determination that the object vehicle 11 cannot be externally charged at the destination is made, the external charging of the object vehicle 11 that is based on the use of the charging facility at the destination is prohibited. Accordingly, the vehicles other than the object vehicle 11 can be allowed to use the charging facility with the determination made that the external charging of the object vehicle 11 cannot be performed at the destination.

Fifth Embodiment

In the fifth embodiment, the infrastructure information is transmitted to the cloud server 30 from the charging facility at the destination and the determination on whether or not the object vehicle 11 can be externally charged at the destination is made by the vehicle information being used along with the infrastructure information regarding the destination as in the third and fourth embodiments. In the fifth embodiment, the SOC is controlled such that the SOC at the destination is higher than in a case where a determination that the external charging can be performed is made, as in the second embodiment described above, in a case where a determination that the object vehicle 11 cannot be externally charged at the destination is made.

A vehicle control system according to the fifth embodiment is identical in basic configuration to the vehicle control system according to the third embodiment.

FIG. 14 is a flowchart illustrating an example of processing procedures executed by the ECU 19 of the object vehicle 11, the management device 32 of the cloud server 30, and the charging facility at the destination according to the fifth embodiment. Referring to FIG. 14, the flowchart includes Step S350 instead of Step S330 in the flowchart according to the third embodiment that is illustrated in FIG. 11.

In other words, once the ECU 19 determines in Step S320 that the object vehicle 11 cannot be externally charged at the destination (NO in Step S320), the ECU 19 of the object vehicle 11 changes the control mode to the CS mode and makes the level of the target SOC (SOC control range) in the CS mode higher than usual (Step S350). In a case where the ECU 19 determines in Step S320 that the object vehicle 11 can be externally charged at the destination (YES in Step S320), the ECU 19 allows the processing to proceed to "RETURN" without executing the processing of Step S350.

In the fifth embodiment, the determination on whether or not the object vehicle 11 can be externally charged at the destination is made by the vehicle information being used along with the infrastructure information regarding the destination as in the third and fourth embodiments. Accordingly, the precision of the determination on whether or not the object vehicle 11 can be externally charged at the destination can be improved. In a case where a determination that the object vehicle 11 cannot be externally charged at the destination is made, the SOC of the object vehicle 11 is controlled such that the SOC at the destination increases. Accordingly, the CD mode led by the EV traveling can be selected in the desired section that follows the departure from the destination (immediately after the departure from the destination, in the vicinity of one's house, and so on), and energy management considering its traveling that follows the departure from the destination can be achieved.

Sixth Embodiment

In the sixth embodiment, the result of the determination on whether or not the object vehicle 11 can be externally charged at the destination is transmitted to the charging facility at the destination, and a message to allow the charging stand 40 to be preferentially used by the EV at the charging facility at the destination is displayed in a case where a determination that the object vehicle 11 cannot be externally charged at the destination is made.

A vehicle control system according to the sixth embodiment is identical in basic configuration to the vehicle control system according to the third embodiment.

FIG. 15 is a flowchart illustrating an example of processing procedures executed by the ECU 19 of the object vehicle 11, the management device 32 of the cloud server 30, and the charging facility at the destination according to the sixth embodiment. Referring to FIG. 15, the flowchart includes Step S550 instead of Step S540 in the flowchart according to the third embodiment that is illustrated in FIG. 11 and further includes Step S420 and Step S430.

In other words, after the determination is executed in Step S530 on whether or not the object vehicle 11 can be externally charged at the destination, the cloud server 30 transmits the result of the determination to the charging facility at the destination of the object vehicle 11 (Step S550). Then, the cloud server 30 allows the processing to proceed to "RETURN".

On the part of the charging facility at the destination of the object vehicle 11, the infrastructure information is transmitted to the cloud server 30 in Step S410, and then a determination is made, based on the determination result received from the cloud server 30, on whether or not the external charging of the object vehicle 11 (HV) is available (Step S420). When the external charging of the object vehicle 11 can be performed (YES in Step S420), the processing proceeds to "RETURN" without the following processing being executed.

Once a determination that the external charging of the object vehicle 11 (HV) cannot be performed is made in Step S420 (NO in Step S420), the message to allow the available charging stand 40 to be preferentially used by the EV is displayed on the display device 44 (FIG. 2) of the charging stand 40 (Step S430) at the charging facility at the destination. As a result, the charging facility can be preferentially used by the EV having a higher external charging priority than the HV including the object vehicle 11.

When it comes to the display timing of the display device 44, the display may be initiated before the object vehicle 11 arrives at the destination or the display may be performed at a time of authorization during the use of the charging stand 40 by the non-object vehicle 12.

Although the flowchart does not include Step S320 and Step S330 illustrated in FIG. 11, the flowchart may include Step S320 and Step S330 as well. In addition, the flowchart may include Step S340 illustrated in FIG. 13 or Step S350 illustrated in FIG. 14 instead of Step S330.

In the sixth embodiment, the charging facility at the destination can be preferentially used by the EV having a higher external charging priority than the object vehicle 11 as described above in a case where a determination that the external charging of the object vehicle 11 (HV) cannot be performed at the destination is made.

The vehicle information regarding the non-object vehicle 12 that has the same destination as the object vehicle 11 (and the infrastructure information in the case of the third to fifth embodiments) may be transmitted from the cloud server 30 to the object vehicle 11 and whether or not the object vehicle 11 can be externally charged at the destination may be determined on the part of the object vehicle 11, as in the modification example related to the first embodiment, in the second to fifth embodiments described above.

In each of the embodiments described above, the cloud server 30 determines whether or not the object vehicle 11 can be externally charged at the destination by using the vehicle information regarding the non-object vehicle 12 that has the same destination as the object vehicle 11. However, the determination on whether or not the object vehicle 11 can be externally charged at the destination may also be made by the vehicle information regarding the non-object vehicle 12 that has already arrived at the destination of the object vehicle 11 being used instead of or along with the vehicle information regarding the non-object vehicle 12 that has the same destination as the object vehicle 11.

It should be noted that the embodiments disclosed above are illustrative in every respect and are not restrictive. The scope of the present disclosure is clarified by the claims, rather than the description of the embodiments, and any alteration that is equivalent in significance to and within the scope of the claims is included in the scope of the present disclosure.

What is claimed is:

1. A control device for a hybrid vehicle provided with an internal combustion engine, an electric motor configured to generate a driving force for the hybrid vehicle and an electric power storage device configured to be charged by a power source outside the hybrid vehicle and to supply electric power to the electric motor, the control device comprising:
    a processor programmed to:
        acquire a plurality of pieces of vehicle information regarding vehicles that are different from the hybrid vehicle and that are configured to be externally charged, the vehicle information including information related to a destination of each vehicle;
        make a determination whether or not the hybrid vehicle is to be externally charged at the destination based on at least one piece of vehicle information among the plurality of pieces of the vehicle information acquired, the at least one piece of the vehicle information being information regarding a same-destination vehicle that has the same destination as the hybrid vehicle but that has not yet reached the same destination; and
        control the hybrid vehicle in accordance with a result of the determination.

2. The control device according to claim 1, wherein:
    the vehicle information further includes vehicle type information indicating whether each vehicle is a vehicle not provided with the internal combustion engine or a vehicle provided with the internal combustion engine and SOC information indicating a state of charge of the electric power storage device of each vehicle; and
    the determination whether or not the hybrid vehicle is to be externally charged at the destination uses the vehicle type information and the SOC information regarding the same-destination vehicle.

3. The control device according to claim 1, wherein:
    the vehicle information further includes charging priority information indicating priority of each vehicle to be externally charged by the power source; and
    the determination whether or not the hybrid vehicle is to be externally charged at the destination uses the charging priority information regarding the same-destination vehicle.

4. The control device according to claim 1, wherein:
    the vehicle information further includes charging amount information indicating a requested amount of charging each vehicle by the power source at the destination; and
    the determination whether or not the hybrid vehicle is to be externally charged at the destination is based on the charging amount information regarding the same-destination vehicle.

5. The control device according to claim 1, wherein:
    the vehicle information further includes time of arrival of the same-destination vehicle at the destination; and
    the determination whether or not the hybrid vehicle is to be externally charged at the destination is based on a difference between time of arrival of the hybrid vehicle at the destination and the time of arrival of the same-destination vehicle at the destination.

6. The control device according to claim 1, wherein:
    the hybrid vehicle is configured to select a first mode in which the electric power stored in the electric power storage device is consumed and a second mode in which consumption of the electric power is suppressed compared to the first mode in accordance with a request from a user; and
    the processor is programmed to execute processing to notify the user of switching from the first mode to the second mode when the first mode remains selected in a case where the result of the determination is that the hybrid vehicle is not to be externally charged.

7. The control device according to claim 1, wherein the processor is programmed to control the state of charge, such that a level of the state of charge of the electric power storage device at the destination of the hybrid vehicle is higher than when the result of the determination is that the hybrid vehicle is to be externally charged, when the result of the determination is that the hybrid vehicle is not to be externally charged.

8. The control device according to claim 7, wherein the processor is programmed to execute predetermined control, such that the internal combustion engine is started with greater ease than when the result of the determination is that the hybrid vehicle is to be externally charged, when the result of the determination is that the hybrid vehicle is not to be externally charged.

9. The control device according to claim 8, wherein the predetermined control to facilitate the starting of the internal combustion engine is configured to include at least one of (i) making a level of a target state of charge of the electric power storage device higher than usual, (ii) making a starting threshold of the internal combustion engine lower than usual, and (iii) increasing charging request power with respect to the electric power storage device.

10. The control device according to claim 1, wherein:
the processor is programmed to further acquire infrastructure information related to a charging facility at the destination of the hybrid vehicle; and make the determination whether or not the hybrid vehicle is to be externally charged at the destination by using the infrastructure information along with the vehicle information regarding the same-destination vehicle.

11. The control device according to claim 10, wherein:
the infrastructure information includes reservation information indicating a reservation for using the charging facility; and
the processor is programmed to make the determination whether or not the hybrid vehicle is to be externally charged at the destination by using the reservation information along with the vehicle information regarding the same-destination vehicle.

12. The control device according to claim 10, wherein the processor is programmed to execute processing to notify the user of the hybrid vehicle of refraining from using the charging facility in a case where the result of the determination is that the hybrid vehicle is not to be externally charged.

13. The control device according to claim 10, wherein the processor is programmed to execute processing to prohibit the hybrid vehicle from being externally charged by the charging facility being used in a case where the result of the determination is that the hybrid vehicle is not to be externally charged.

14. The control device according to claim 10, the processor is further programmed to perform notification for the vehicle not provided with the internal combustion engine to use the charging facility in a case where the result of the determination is that the hybrid vehicle is not to be externally charged.

15. A control method for a hybrid vehicle provided with an internal combustion engine, an electric motor configured to generate a driving force for a hybrid vehicle, and an electric power storage device configured to be capable of being charged by a power source outside the vehicle, and supplying electric power to the electric motor, the control method comprising:
acquiring vehicle information regarding vehicles that are different from the hybrid vehicle and that are configured to be externally charged, the vehicle information including information related to a destination of each vehicle;
making a determination whether or not the hybrid vehicle is to be externally charged at the destination based on pieces of vehicle information regarding a same-destination vehicle that has the same destination as the hybrid vehicle but that has not yet reached the same destination; and
controlling the hybrid vehicle in accordance with a result of the determination.

* * * * *